United States Patent
Chartier et al.

(10) Patent No.: US 11,393,348 B1
(45) Date of Patent: Jul. 19, 2022

(54) AUTONOMOUS AND AUTOMATIC, PREDICTIVE AIRCRAFT SURFACE STATE EVENT TRACK SYSTEM AND CORRESPONDING METHODS

(71) Applicant: Architecture Technology Corporation, Minneapolis, MN (US)

(72) Inventors: Eric Chartier, St. Louis Park, MN (US); Paul Davis, Saratoga, CA (US); Erin Gambucci, San Jose, CA (US); Douglas Sweet, Sunnyvale, CA (US)

(73) Assignee: Architecture Technology Corporation, Minneapolis, MN (US)

( * ) Notice: Subject to any disclaimer, the term of this patent is extended or adjusted under 35 U.S.C. 154(b) by 375 days.

(21) Appl. No.: 16/542,334

(22) Filed: Aug. 16, 2019

Related U.S. Application Data

(63) Continuation-in-part of application No. 16/357,216, filed on Mar. 18, 2019, which is a continuation of
(Continued)

(51) Int. Cl.
*G08G 5/00* (2006.01)
*B64D 45/00* (2006.01)

(52) U.S. Cl.
CPC ........... *G08G 5/0078* (2013.01); *B64D 45/00* (2013.01); *G08G 5/0008* (2013.01);
(Continued)

(58) Field of Classification Search
CPC .. G08G 5/0078; G08G 5/0008; G08G 5/0013; G08G 5/0026; G08G 5/0043; B64D 45/00; B64D 2045/0075
(Continued)

(56) References Cited

U.S. PATENT DOCUMENTS

| | | | | |
|---|---|---|---|---|
| 4,845,629 A | * | 7/1989 | Murga | G08G 5/0026 701/120 |
| 6,920,390 B2 | * | 7/2005 | Mallet | G08G 5/0026 340/988 |

(Continued)

FOREIGN PATENT DOCUMENTS

| | | | | |
|---|---|---|---|---|
| CN | 105527971 A | * | 4/2016 | B64F 5/60 |
| EP | 2259245 A2 | * | 12/2010 | G08G 5/025 |

(Continued)

OTHER PUBLICATIONS

Tang et al., "Aircraft Taxi Route Planning for A-SMGCS Based on Discrete Event Dynamic System modeling," 2010, vol. 1, Publisher: IEEE.*

(Continued)

*Primary Examiner* — Tuan C To
(74) *Attorney, Agent, or Firm* — Key IP Law Group, PLLC

(57) ABSTRACT

An automatic, autonomous predictive aircraft surface state event track (ASSET) system, includes a mobile device onboard an aircraft and a remote service in communication with the mobile device. The mobile device includes a processor, and an application that in turn includes machine instructions encoded on a non-transitory computer-readable storage medium. The processor executes the machine instructions to receive sensor data from aircraft onboard sensors, the sensor data indicating an operational state of the aircraft; and transmit the sensor data. The remote service receives the sensor data and includes a remote processor that executes machine instructions to compute an operational state of the aircraft; identify an aircraft event associated the aircraft; and using the aircraft operational data, the sensor data, and the event, predict that the aircraft will meet a next scheduled aircraft event within a specified time window.

20 Claims, 15 Drawing Sheets

Related U.S. Application Data application No. 15/588,574, filed on May 5, 2017, now Pat. No. 10,235,892.

(52) U.S. Cl.
CPC ......... *G08G 5/0013* (2013.01); *G08G 5/0026* (2013.01); *G08G 5/0043* (2013.01); *B64D 2045/0075* (2013.01)

(58) Field of Classification Search
USPC ........................................................ 701/120
See application file for complete search history.

(56) References Cited

U.S. PATENT DOCUMENTS

| | | | | |
|---|---|---|---|---|
| 8,019,529 | B1* | 9/2011 | Sharma | G08G 5/06 701/117 |
| 8,612,581 | B1* | 12/2013 | Craig | H04B 7/18506 709/224 |
| 10,079,757 | B2* | 9/2018 | Jackson | H04L 63/102 |
| 10,242,582 | B1* | 3/2019 | Ogden | G08G 5/025 |
| 10,621,874 | B2* | 4/2020 | Vieten | G08G 5/0013 |
| 2004/0225440 | A1* | 11/2004 | Khatwa | G01S 19/15 340/945 |
| 2005/0015202 | A1* | 1/2005 | Poe | G08G 5/0078 340/945 |
| 2006/0114124 | A1* | 6/2006 | Vickas | G08G 1/166 340/905 |
| 2008/0075090 | A1* | 3/2008 | Farricker | H04L 47/10 370/395.53 |
| 2010/0017049 | A1* | 1/2010 | Swearingen | G06N 7/005 701/3 |
| 2011/0184635 | A1* | 7/2011 | Khatwa | G08G 5/025 701/120 |
| 2013/0131888 | A1* | 5/2013 | Nutaro | G08G 5/065 701/1 |
| 2013/0265187 | A1* | 10/2013 | Hall | G01S 13/933 342/37 |
| 2015/0298817 | A1* | 10/2015 | Jackson | G08G 5/065 701/3 |
| 2016/0164763 | A1* | 6/2016 | Heron | B64D 11/00155 709/224 |
| 2016/0196754 | A1* | 7/2016 | Surace | G08G 5/0013 701/117 |
| 2016/0379499 | A1* | 12/2016 | Balasubramanian | G08G 5/0013 701/300 |
| 2017/0045409 | A1* | 2/2017 | Cousins | G01M 1/125 |
| 2017/0061806 | A1* | 3/2017 | Daveau | G08G 5/065 |

FOREIGN PATENT DOCUMENTS

| | | | | |
|---|---|---|---|---|
| EP | 2317488 | A2 * | 5/2011 | G01C 23/00 |
| EP | 3109845 | A1 * | 12/2016 | G08G 5/0021 |
| RU | 2560220 | C1 * | 8/2015 | G06Q 10/06 |
| RU | 2014136376 | A * | 4/2016 | |
| WO | WO-9732291 | A1 * | 9/1997 | G08G 5/0082 |

OTHER PUBLICATIONS

S. Kamineni et al., "Electronic Moving Map of Airport Surface on Electronic Flight Bag," 2004, vol. 1, Publisher: IEEE.*

I. Sen et al., "The Ground-to-Ground Airport Surface Area Channel: Transmission/Reception from Airport Field Sites," 2006, Publisher: IEEE.*

* cited by examiner

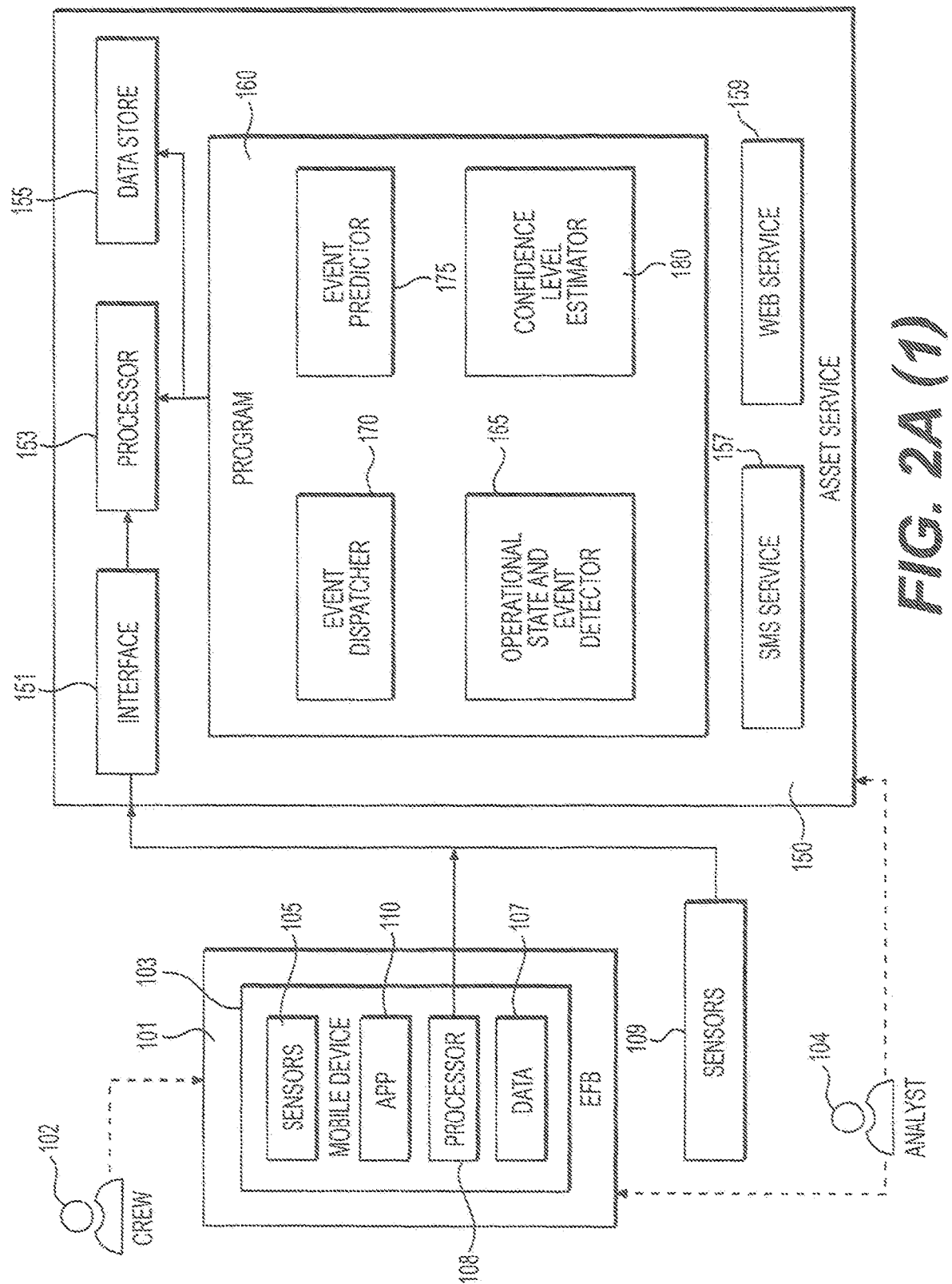
FIG. 2A (1)

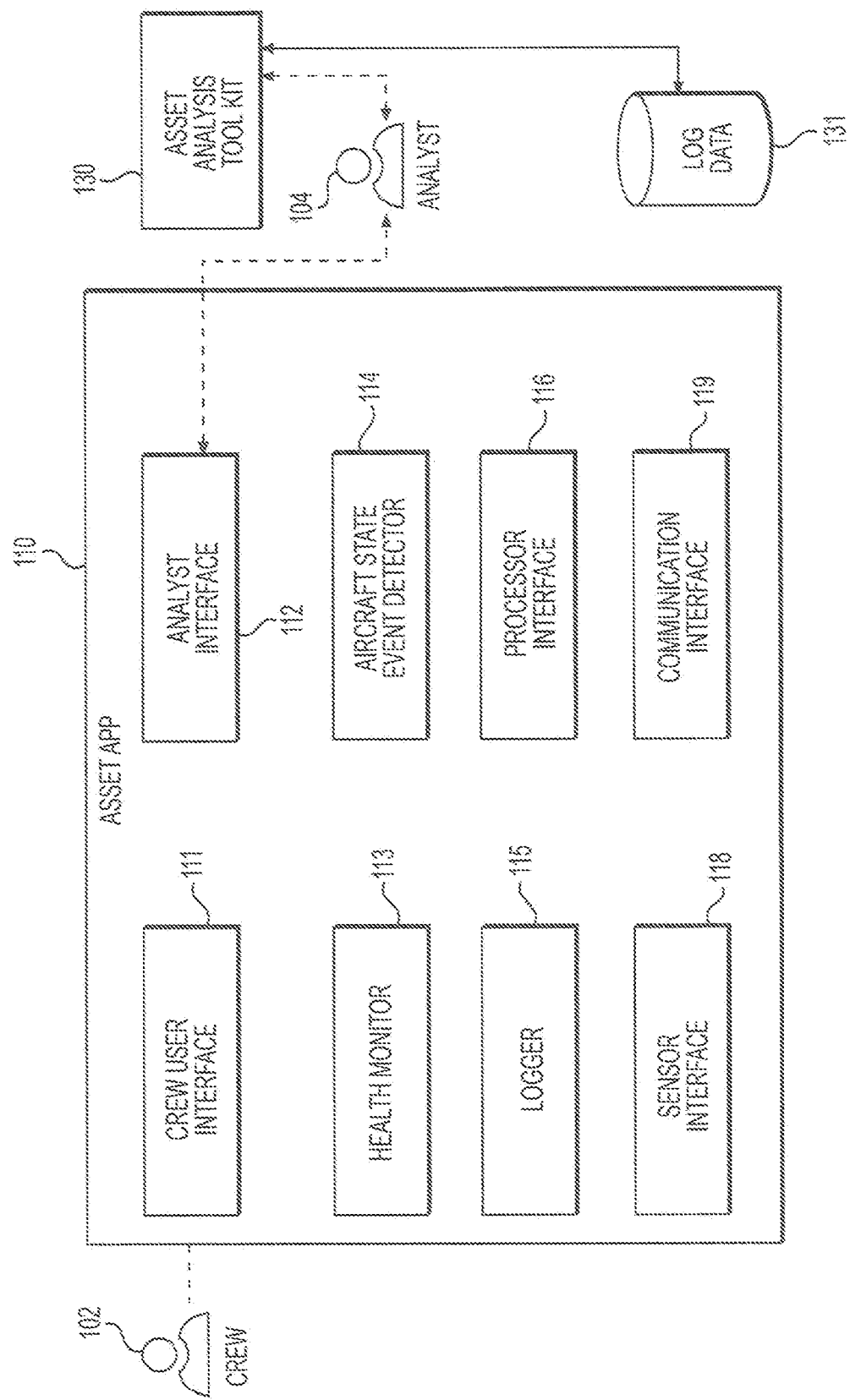
FIG. 2A (2)

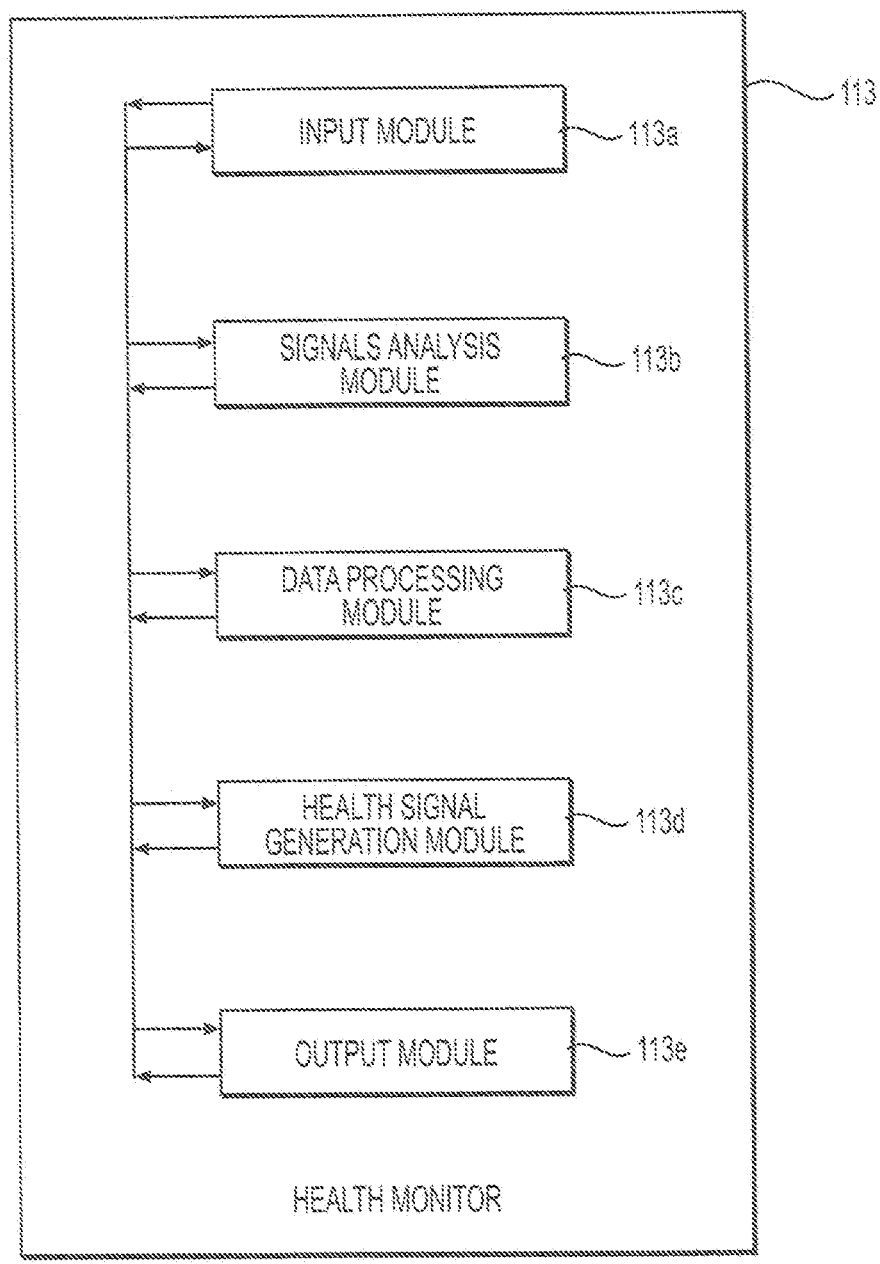
FIG. 2A (3)

AUTONOMOUS AND AUTOMATIC, PREDICTIVE AIRCRAFT SURFACE STATE EVENT TRACK SYSTEM AND CORRESPONDING METHODS

RELATED APPLICATIONS

This application is a continuation-in-part of U.S. patent application Ser. No. 16/357,216 filed Mar. 18, 2019, entitled AIRCRAFT SURFACE STATE EVENT TRACK SYSTEM AND METHOD, which is a continuation of U.S. patent application Ser. No. 15/588,574, now U.S. Pat. No. 10,235,892, filed May 5, 2017 and issued Mar. 19, 2019, entitled AIRCRAFT SURFACE STATE EVENT TRACK SYSTEM AND METHOD. The disclosures of these two prior applications are incorporated by reference.

BACKGROUND

Air traffic control uses a complex regime of systems, methods, rules, and procedures, some dictated by government agencies, to ensure safe and efficient movement of aircraft, on the ground and in the air. One aspect of this regime involves evaluation of aircraft-related events at a departure airport to predict events at an arrival airport. For example, whether an airplane makes its arrival slot may depend on whether the same airplane departed on time. Whether an airplane makes its scheduled departure time may depend on events that occur on movement and non-movement areas of the departure (origination) airport.

One example procedure currently in use in this regime is that, after takeoff, aircraft may be directed to merge into en route (Center) airspace traffic flows—the aircraft are "metered." (In air traffic control, an Area Control Center (ACC), also known as a Center (or in some cases, en-route, as opposed to TRACON control), is a facility responsible for controlling aircraft en route in a particular volume of airspace (a Flight Information Region) at high altitudes between airport approaches and departures. Such a Center also may be referred to as an Air Route Traffic Control Center (ARTCC).) Departure and arrival airports may be in the same Center, or in separate Centers. In some cases, constraints associated with these Center traffic flows create localized demand/capacity imbalances—that is, demand for space or slots in a Center traffic flow exceeds capacity of the Center traffic flow. When demand exceeds capacity, Traffic Management Coordinators (TMCs) at a Center and Frontline Managers (FLMs) at a Local airport may use a procedure referred to as tactical departure scheduling to manage the flow of departures into the constrained Center traffic flow. Tactical departure scheduling usually involves a Call for Release (CFR) procedure in which a Local air traffic control (i.e., at a Local airport Tower) calls the Center to coordinate an aircraft release time prior to allowing the aircraft to depart. Currently, release times are computed at the Center using a Center Traffic Management Advisor (TMA) decision support tool, based upon manual estimates of aircraft ready time that are verbally communicated from the Tower to the Center. The TMA-computed release time then is verbally communicated from the Center back to the Tower where the release time is relayed to the Local air traffic controller as a release window, which typically is three minutes wide. The Local air traffic controller manages aircraft departure to meet the coordinated release time window. Manual ready time prediction by the Local air traffic controller and verbal release time coordination between the Local and Center are labor intensive and prone to inaccuracy. Also, use of release time windows adds uncertainty to the tactical departure process. Currently, many tactically-scheduled aircraft miss their en route slot due to ready time prediction uncertainty.

Furthermore, about 25% of arrival-metered aircraft involve a tactical departure. This means that 25% of inbound flights metered by an arrival TMA system (i.e., at an Arrival Center) are scheduled (i.e., have slots reserved) in the overhead stream while the aircraft still are on the surface at the departure airport. An emerging demand for tactical departure scheduling and the significant uncertainty tactically-scheduled aircraft represent to the en route schedule, increases the importance of integrating departure airport surface information into departure scheduling.

The Aircraft Communications Addressing and Reporting System (ACARS), introduced in 1978, provided a digital datalink system for transmission of short messages between aircraft and ground stations via airband radio or satellite. One aspect of ACARS is the ability to automatically detect and report the start of each major flight phase, called OOOI (out of the gate, off the ground, on the ground, and into the gate). About 70% of U.S. commercial flights involve OOOI events. These OOOI events are detected using input from aircraft sensors mounted on doors, parking brakes, and struts. At the start of each flight phase, an ACARS message is transmitted to the ground describing the flight phase, the time at which it occurred, and other related information such as the amount of fuel on board or the flight origin and destination. These messages are used to track the status of aircraft and crews. However, ACARS cannot predict whether an airplane will meet its scheduled states, such as departure states gate pushback, runway entry, and takeoff, and ACARS does not provide information that allows Center and Local flight management personnel to coordinate aircraft departure and thereby improve departure slot performance.

Airport surface surveillance using traditional radar-based or multilateration systems have the potential to improve departure slot performance, but may not be a viable option. Airport surface surveillance systems are very expensive to procure, install, and maintain. The high cost makes these surface surveillance systems impractical for most airports. Furthermore, surveillance in an airport's non-movement presents additional challenges such as limited line-of-sight and multipath interference caused by buildings and other structures. Still further, the FAA is responsible for movement areas of an airport while the airport is responsible for non-movement areas, and the FAA does not surveil the non-movement areas, and does not use non-movement area surveillance. Other complications lessen the reliability of current surface surveillance systems.

SUMMARY

An automatic and autonomous predictive aircraft surface state event track (ASSET) system includes a mobile device onboard an aircraft and a remote service in communication with the mobile device. The mobile device includes a processor and an application that in turn includes machine instructions encoded on a non-transitory computer-readable storage medium. The processor executes the machine instructions to receive sensor data from aircraft onboard sensors, the sensor data indicating an operational state of the aircraft; and transmit the sensor data. The remote service receives the sensor data and includes a remote processor and a remote, non-transitory computer-readable storage medium having encoded thereon machine instructions that when executed by the remote processor, cause the remote processor to compute an operational state of the aircraft; identify an aircraft event associated with the aircraft; and using the aircraft operational data, the sensor data, and the event, provide a prediction that within a statistically derived time window the aircraft will meet a future aircraft surface state event.

An autonomous and automatic method for predicting an aircraft operating on an airport surface will meet a scheduled future event includes a processor on a mobile device onboard the aircraft receiving sensor data from aircraft onboard sensors, the sensor data indicating an operational state of the aircraft, processing the sensor data, and transmitting the processed sensor data. The method further includes a remote service processor receiving the transmitted processed sensor data, determining an operational state of the aircraft based on the received sensor data, identifying an aircraft event based on the determined operational state, and using the aircraft operational data, the sensor data, and the event, providing a prediction that within a statistically-derived time window, the aircraft will meet a future aircraft surface state event.

A method, executed by a processor, includes the processor receiving signals information from a device located on a departing airplane; verifying an identification of the airplane and identifying an expected departure sequence of aircraft surface state events; monitoring and identifying additional signals information received from the mobile device, including comparing the additional signals information to known data; logging the additional signals information, and processing the additional signals information, and determining the logged data corresponds to an aircraft surface state event; sending an aircraft surface state event reached message to Local and Center flight management; and executing a statistical routine and providing statistical data from the execution relating to an occurrence of upcoming aircraft surface state event and sending the statistical data with the aircraft surface state event message.

A non-transitory, computer-readable storage medium having encoded thereon machine instructions that when executed by a processor, cause the processor to receive signals information from a device located on a departing airplane; verify an identification of the airplane and identify an expected departure sequence of aircraft surface states; monitor and identify additional signals information received from the mobile device, wherein the processor compares the additional signals information to known data; logs the additional signals information; processes the additional signals information; and determines the logged data corresponds to an aircraft surface state event. The processor then causes transmission of an aircraft surface state event reached message to Local and Center flight management, and executes a statistical routine and provides statistical data from the execution relating to an occurrence of upcoming aircraft surface state event and sending the statistical data with the aircraft surface state event message.

An aircraft surface state event track (ASSET) system includes a mobile device installed on an aircraft, the mobile device including sensors to record signals information indicative or operation of the aircraft; and a processor in communication with the mobile device. The processor executes machine instructions to receive signals information from the mobile device, identify the signals information received from the mobile device, compare the identified signals information to known data, based on the comparison, determine the aircraft is at a defined aircraft surface state event, send an aircraft surface state event reached message to Local and Center flight management; and execute a statistical routine and provide statistical data from the execution relating to an occurrence of upcoming aircraft surface state events and send the statistical data with the aircraft surface state event message.

DESCRIPTION OF THE DRAWINGS

The detailed description refers to the following figures in which like numerals refer to like items, and in which:

FIGS. 2A(1)-2A(3) illustrate an example predictive aircraft surface state event track system;

DETAILED DESCRIPTION

Figure 1A:
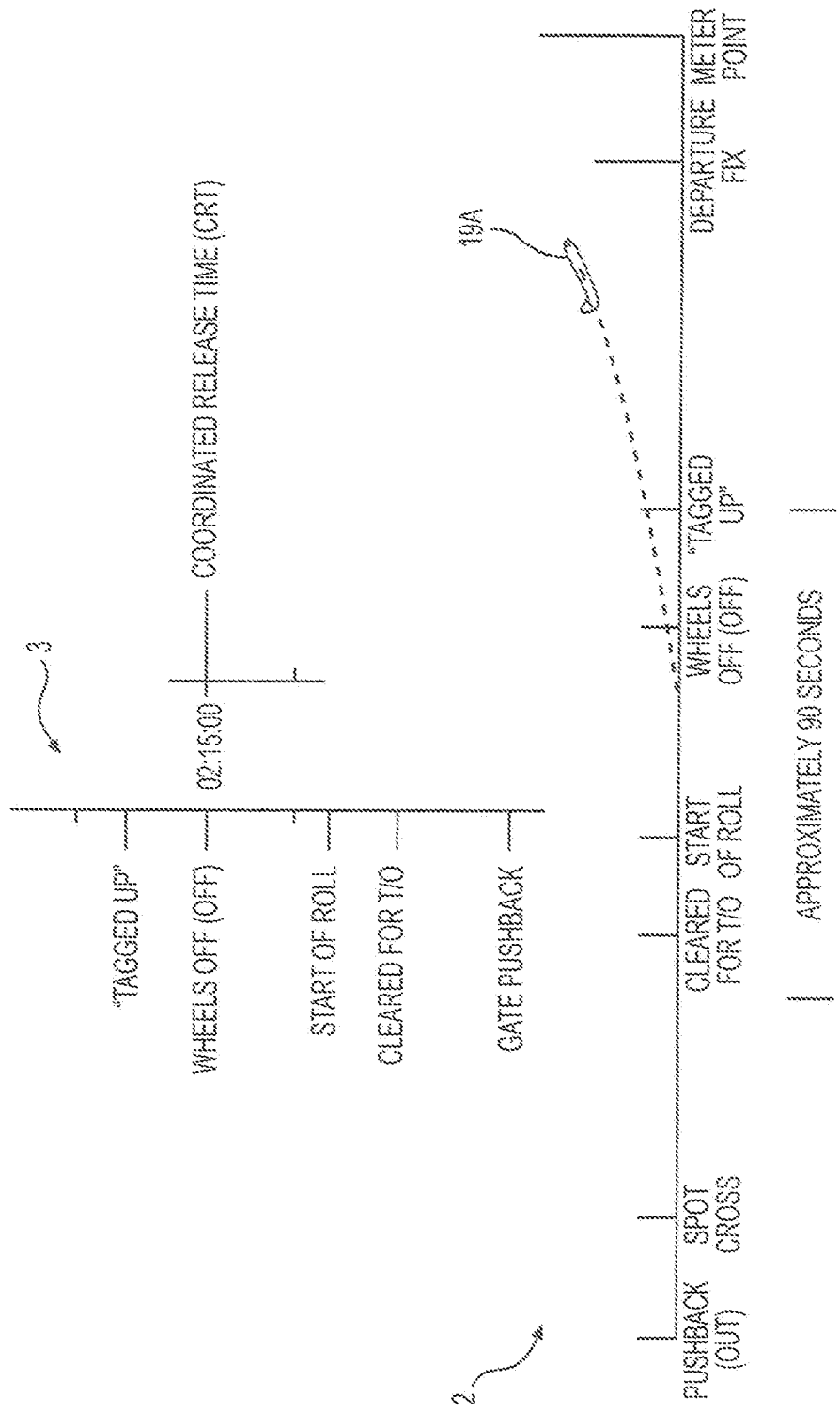
FIG. 1A shows a profile and time line of events that occur during take-off of a tactically-scheduled aircraft.

At airports large and small, safe and efficient aircraft traffic management requires accurate information about aircraft on the airport surface, from gate to runway. However, only a few U.S. airports have surface surveillance systems, and in almost every case coverage is limited to the airport's movement area. In addition, safe and efficient aircraft traffic management requires accurate and timely aircraft arrival information, and such arrival information may be affected by aircraft events that occur at the aircraft's departure (originating) airport.

In addition to improving airport safety by preventing incidents between and among moving aircraft and between and among moving aircraft and ground vehicles, a surface surveillance system also may improve airport efficiency by ensuring that scheduled aircraft arrivals and departures occur with minimal delays and at minimal intervals consistent with safety. For example, an airport may adopt a time-based flow management (TBFM) system that ensures efficient (i.e., on-time or on schedule) aircraft departure considering on-time considerations for aircraft arrival. That is, an aircraft's departure time may need to be met to ensure the aircraft's arrival fits into a crowded aircraft arrival stream. If the departing aircraft is not able to take off within its scheduled departure slot, a corresponding slot in the arrival stream may go unused. A series of missed departures slots can result in runway starvation, resulting in wasted resources, additional arrival and/or departure delays and frustrated travelers.

While airports have installed surface surveillance systems to address the above noted concerns, only 43 of the more than 500 "towered" airports in the U.S. National Airspace System (NAS) have surface surveillance and only a small fraction of those have non-movement area surveillance. Furthermore, the only U.S. airport with an operational departure management system (DMS) is JFK International Airport (JFK). The JFK DMS uses one surveillance system for movement area (e.g., runway, taxiway) surveillance and another surveillance system for the airport's non-movement area (i.e., areas on which aircraft may be found, other than runways and taxiways). At JFK, a departure coordinator may use the non-movement area surveillance to verify a flight will meet its intended time to enter the movement area (i.e., in preparation for takeoff). If the airline provides an estimated time for gate pushback, the departure coordinator could use non-movement area surveillance to determine whether a flight likely will meet its target movement area arrival time. If the aircraft is late departing the gate, the departure coordinator may change the departure sequence to minimize missed runaway opportunities. However, without non-movement area surveillance data, the departure coordinator may not be able to accurately estimate if the aircraft will meet its target movement area arrival time. Missed movement area arrival times create holes or inefficiencies in the departure sequence resulting in suboptimal runway use.

To address efficient airport operations while maintaining required safety, disclosed herein are systems and methods that may improve airport departure and arrival performance, regardless of airport size, without the installation and maintenance of expensive and complicated automated surface surveillance systems, such as those at JFK. The disclosure that follows refers to aircraft surface state events, which are time-based events in an aircraft's departure sequence or arrival sequence. Some events, such as tagged up in a departure sequence, actually may occur after the surface state event of wheels off. Aircraft operational state (or simply aircraft state) may refer to the condition of an aircraft operating on the airport surface, such as stopped, accelerating, moving. The herein disclosed aircraft surface state event track (ASSET) systems and methods determine aircraft surface state events at several points in a departure sequence. Aircraft state may be used in determining these aircraft surface state events. The ASSET systems and methods further provide a confidence interval and/or level that certain of the aircraft surface state events will be reached or achieved at an expected time. The occurrence of the surface state events and corresponding confidence intervals and levels are passed to Local air traffic control and other flight management personnel and systems. This information then may be passed to Center flight management personnel and systems. The information thus passed allows flight management personnel and systems to assess if a departing aircraft will meet its intended arrival time, or in the case of metered aircraft, if the departing aircraft will reach its designated en route slot.

The herein disclosed systems and methods may refer to the following terms and their definitions (for some terms, the definition(s) provided comes from a government agency (e.g., FAA) or a non-government body (e.g., International Civil Aviation Organization (ICAO)); other terms, and their definitions, are provided for ease of description of the herein disclosed inventions, and such references will be understood to incorporate the definitions provided herein for these terms.

Aircraft (or airplane) event generally refers to an operation or milestone achieved or to be achieved by a specific airplane during airport departure and airport arrival. Such aircraft events are expected to be completed (e.g., are scheduled) at a certain time during departure or arrival. Examples of scheduled aircraft events during departure are gate pushback, runway entry, and wheels off.

Aircraft state generally refers to the condition of a specific airplane during a departure or arrival sequence, at or between events. For example, the gate pushback event may be accompanied by aircraft direction change (typically yaw during operations on an airport's surface), lateral displacement, acceleration, speed, and engine operation.

Airline operations center (AOC) refers to a control center used by a specific airline or air carrier.

Airport movement area refers to the runways, taxiways, and other areas of an airport that are used for taxiing, takeoff, and landing of aircraft, exclusive of loading ramps and aircraft parking areas (See 14 C.F.R. § 139.3 (Definitions)).

Airport non-movement area refers to aircraft loading ramps and aircraft parking areas; the term "non-movement area" is not defined in 14 C.F.R. § 139.3.

Airport Surface Detection Equipment, Model X, or (ASDE-X) refers to a runway-safety tool that enables air traffic controllers to detect potential runway conflicts by providing detailed coverage of movement on runways and taxiways. By collecting data from a variety of sources, ASDE-X tracks vehicles and aircraft on airport surfaces and obtains identification information from aircraft transponders.

Automatic dependent surveillance-broadcast (ADS-B) refers to a surveillance technology in which an aircraft determines its position via satellite navigation and periodically broadcasts the position, enabling the aircraft to be tracked. The aircraft position information can be received by air traffic control ground stations as well as by other aircraft to provide situational awareness and allow self-separation between and among aircraft. ADS-B is "automatic" in that it requires no pilot or external input. ADS-B is "dependent" in that it depends on data from the aircraft's onboard equipment.

Automated airport surveillance system refers to a radar system used at airports to detect and display the position of aircraft in the terminal area and the airspace around the airport, and may constitute the main air traffic control system for the airspace around airports. At large airports, the surveillance typically controls traffic within a radius of 30 to 50 nautical miles of the airport.

Center refers to a central flight management entity that may provide regional airspace control and monitoring for several airports. The Center may communicate with Local air traffic control and other entities at each of its serviced airports and with other Centers.

Center flight management refers to systems, such as the TMA, organizations, and personnel at the Center that operate to manage flights through the airspace under Center supervision.

Commercial off-the-shelf (COTS) refers to commercially available components that may be incorporated in various airport and aircraft systems.

Electronic Flight Bag (EFB) refers to an electronic information management device that helps flight crews perform flight management tasks more easily and efficiently with less paper. The EFB includes a computing platform intended to reduce, or replace, paper-based reference material often found in the pilot's carry-on flight bag, including the aircraft operating manual, flight-crew operating manual, and navigational charts (including moving map for air and ground operations). In addition, the EFB can host purpose-built software applications to automate other functions normally conducted by hand, such as performance take-off calculations. The FAA classifies EFBs as either "Portable" or "Installed." A Portable EFB can be temporarily connected to the aircraft's power supply, data ports, or antennas. An Installed EFB, as the name implies, is fully installed on the aircraft and must meet airworthiness certification regulations.

Estimated off block time (EOBT) refers to the estimated time an aircraft will begin movement associated with departure (i.e., move off its gate/stand).

Freeze horizon refers to the time at which an aircraft's scheduled time of arrival (STA) at a specific geographical point becomes fixed. This setting ensures that last minute changes to the ETA are avoided. This setting can be expressed as a prescribed flying time to the meter fix.

Local flight management, or Local air traffic control refers to systems, organizations, and personnel, at a Local airport, that execute processes or supervise systems to control aircraft on the non-movement areas of the Local airport and that interface with aircraft during takeoff from and approach to the Local airport.

Metering times refers to times aircraft are assigned to reach certain points, and metering times are an aspect of Time Based Flow Management (TBFM), a tool intended to manage traffic flows by scheduling and spacing aircraft to their arrival airport. (Not all commercial aircraft currently are metered.) Through TBFM, an automation system uses a schedule of runway assignments and landing times to sequence inbound flights, and allocates delays to various segments of each flight to meet the assigned schedule. TBFM is administered by traffic managers at an Air Route Traffic Control Center (ARTCC).

Multilateration refers to a surveillance technology that calculates an aircraft's position from the small differences in timing of when a transponder signal from the aircraft is received by ground antennas. Any transponder-equipped aircraft can be tracked by multilateration.

Ramp refers to a non-movement area where pre-flight activities, such as parking and maintenance.

Runway, in the parlance of the International Civil Aviation Organization (ICAO), refers to a "defined rectangular area on a land aerodrome prepared for the landing and takeoff of aircraft."

Surface movement radar (SMR) refers to radar systems used to non-cooperatively detect objects (e.g., aircraft, vehicles, people, wildlife) on the surface of an airport. Air traffic controllers may use SMR to supplement visual observations. SMR also may be used at night and during low visibility to monitor the movement of aircraft and vehicles.

Target movement area entry time (TMAT) refers to the time a departing aircraft is planned to transition from the non-movement area of an airport to the movement area. A TMAT is generated as a part of departure sequencing and flight operators plan their departure process in order to achieve that TMAT. TMATs may be specified to meter the rate of departure entries into the movement area of the airport.

Target off block time (TOBT) refers to a point in time to be monitored and confirmed by the airline/handling agent at which the ground handling process is concluded, all aircraft doors are closed, all passenger boarding bridges have been removed from the aircraft and thus start-up approval and push-back/taxi clearance can be received.

Terminal radar approach control facility (TRACON) refers to a centralized control station that provides approach and departure services for one or more airports, including the safe, orderly, and expeditious flow of arrival, departure, and en-route traffic.

Time-Based Flow Management (TBFM) refers to a FAA program that implements a time-based air traffic scheduling and spacing automation tool to optimize aircraft movement.

Traffic Management Coordinator (TMC) refers to an air traffic control position, at an en route facility (Center) who is responsible for ensuring that efficient and effective traffic management is maintained.

The herein disclosed predictive aircraft surface state event (ASSET) system and corresponding ASSET methods may be automatic autonomous. The ASSET system detects and reports standard aircraft departure and arrival events including gate pushback, takeoff (OFF), landing (ON) and gate arrival. The system further detects and reports on other events in a departure or arrival sequence including movement area entry, runway entry, runway exit, non-movement area entry, de-icing pad entry and exit, and other events. The system also detects and reports on aircraft operational states including parked at an unknown location, parked at gate, pushing back, taxiing in a non-movement area, waiting in a non-movement area, taxiing in a movement area, waiting in a movement area, queueing for departure, waiting for runway entry clearance, taxiing on runway, waiting for takeoff clearance, takeoff roll, and deicing. The system will predict the occurrence of a scheduled future event and whether the event occurs within a scheduled or expected time window, along with a confidence level that the scheduled future event will occur in the expected or scheduled time window. The system may use onboard sensors and other equipment to meet schedule events. The system also may use onboard non-sensor information, and information from other sources, and sensor data from non-onboard sensors. In an embodiment, the system includes onboard aircraft components and remote components. In an embodiment, the onboard aircraft components may be mobile components. The mobile components need not be FAA-certified components. The remote components may be cloud-based components. Detection of events and operational states and prediction of future event occurrences may be executed at the remote location based at least in part on data and information obtained by the onboard aircraft components and provided by the onboard aircraft components to the remote components.

The ASSET system may incorporate a health monitoring module that ensures the ASSET system performs with sufficient accuracy and minimal latency. The health monitor module checks sensor data quality, such as the reported horizontal position accuracy, and determines when the data should no longer be used for determining aircraft events and states. The health monitor module also detects when a sensor has stopped reporting data. For both of these cases, the health monitor module may generate an alert.

FIG. 1A illustrates a profile 2 and time line 3 of aircraft surface state events that occur during departure of a tactically-scheduled aircraft. A similar profile may exist for any aircraft take-off; the main difference being a Coordinated Release Time negotiated between Center and Local flight management personnel for tactically-scheduled aircraft. In FIG. 1A, airplane 19A is seen departing from a Local airport with a Coordinated Release Time. The profile 2 shows a series of aircraft surface state events, all of which occur with some time variability. The profile 2 begins with a gate pushback event followed by a spot cross event (the airplane 19A leaves the ramp and enters a taxiway, for example). Next is Cleared for T/O event, which is the Local air traffic controller issuing a takeoff clearance, and is the time at which control of actual takeoff is ceded to the pilot. Ideally, the tower air traffic controller issues the takeoff clearance so that airplane 19A takes off within a time widow of the Coordinated Release Time. However, variability in some subsequent events may cause the window to be missed. Start of roll occurs at some variable time after the pilot receives the takeoff clearance. Start of roll variability results from human factors (i.e., the pilot) and aircraft characteristics. Wheels off (OFF) is the aircraft surface state event at which the weight of the airplane 19A comes off its wheels and is the point at which the airplane 19A becomes airborne. The time between start of roll and OFF depends largely on meteorological conditions (e.g., temperature and wind), aircraft weight, and other aircraft characteristics (e.g., engine thrust, wing configuration). Tagged up is an airborne event that occurs at the time at which airplane 19A is acquired by TRACON surveillance and "tags up" on the radar scope. After tagged up, the airplane 19A proceeds to its departure fix and then its meter point.

Some aircraft surface state events shown in FIG. 1A may be detected by onboard sensors. For example, OFF may be detected by a sensor that actuates when the wheel struts are fully retracted or by a sensor that detects when the wheel well doors close. Some events and operational states leading up to takeoff may not be easily detected by current onboard sensors. In particular, events occurring in the airport's non-movement areas are not as amenable to accurate detection and monitoring by current onboard sensors.

Referring to an example of an aircraft (metered or not metered) preparing to depart an airport that does not have an automated surface surveillance system, prior to the assigned departure time the herein disclosed predictive aircraft surface state event track (ASSET) system 100 detects specific data that define or relate to various possible aircraft events and states and uses the detected data to predict occurrence of a current or future event. For example, the system 100 may detect data that indicate a departing aircraft has pushed back or is pushing back from its gate. The system 100 may compute a confidence level and/or interval that the occurrence of these events will result in the aircraft meeting its scheduled take-off time and the system 100 then may provide a Traffic Management Coordinator (TMC) with a level of confidence or expectation that the aircraft will take off on time. The system 100 then may pass the aircraft surface state event information to other entities in a traffic management system.

In the above example, a departure reservoir coordinator (e.g., a Local air traffic controller) may use non-movement area surveillance provided by the predictive aircraft surface state event track ASSET system 100 to verify a flight will meet its target movement area entry time (TMAT). If the airline provides target off block times (TOBTs), the departure reservoir coordinator could use ramp area surveillance to determine whether a flight met its TOBT and thus likely will meet its TMAT. If the TMAT cannot be met, the departure reservoir coordinator may change the departure sequence to minimize missed runaway opportunities.

Instead of actively tracking the location of all aircraft in the movement area, the predictive aircraft surface state event track ASSET system 100 provides a cost-effective approach for small/medium airports and for the non-movement areas of all airports by tracking certain aircraft events. For a departing aircraft, these events may include the aircraft: (1) pushes back from the gate, (2) starts taxiing, (3) stops taxiing, (4) enters an airport movement area, and (5) takes off. Knowing the aircraft's state at these discrete events and corresponding points in time may provide enough information to compensate for a lack of surveillance. In an embodiment, the ASSET system 100 may use information from existing sensors in cockpit-based devices and upload the data to an associated cloud-based system. An associated cloud-based sub-system of the ASSET system 100 then determines aircraft events and corresponding aircraft states in both the movement and non-movement areas, and may predict the likelihood that the aircraft will meet its scheduled next event as well as its scheduled departure window. This information may be monitored by other systems/operators that implement strategic or tactical adjustments as needed to maintain airport and airspace efficiency.

Portions of the ASSET system 100 are implemented as software and possibly hardware devices onboard an aircraft. Such software and hardware may be incorporated into current hardware devices found in an aircraft's cockpit. One such device is a mobile tablet device or smart phone (mobile device). Another is an Electronic Flight Bag (EFB). Many air carriers have equipped their aircraft with EFBs. Many EFBs may include devices with multiple sensors. The predictive ASSET system 100 may access the sensors to obtain a variety of data that may be used to determine aircraft state and aircraft events. In aircraft without an EFB, cockpit crews may use mobile phones with similar internal sensors. In either situation, the mobile devices present in an airplane's cockpit should have a rich set of sensors that may provide information that may be interpreted to ascertain aircraft state. The mobile devices also provide a level of redundancy, and the devices combine and process data (e.g., location, acceleration, velocity, compass heading, sound, and vibration) from multiple sensors. For example, a mobile phone may have multiple sensors that can determine location (Wi-Fi, cellular, and GPS) and typically employs software that selects the method that provides a reasonable result using the least amount of power (if running on battery). Accuracy of the location depends on the type of sensor used and other factors such as distance from transmitters, line of sight, and electromagnetic interference, for example. Motion of the mobile device may be determined by accelerometers and/or GPS. Microphones and other sensors built into the mobile devices also may be used by the aircraft surface state event track system. For example, a comparison of acoustic signatures could determine when aircraft engines have been turned on or off.

In an embodiment, the predictive ASSET system 100 includes an ASSET system application (App) 110 and an ASSET system service 150. The ASSET system 100 may use "Portable" EFBs and mobile devices that can transmit their sensor data. An ASSET system App running on a device may access the sensor data via the device's operating system application programming interface (API). The sensor data may be securely transmitted to the ASSET system service 150 using a cellular link or another aircraft onboard datalink such as SatCom. The ASSET system service 150 may be cloud-based. Using the cloud eliminates the need for servers and software at each airport and thus additional resources can be inexpensively added to support increases in demand and the number of airports serviced.

The service 150 analyzes the stream of mobile sensor data, external sensor data, and other information in real-time to derive aircraft state and state change events. Unlike a surveillance system, the service 150 does not need the precise location of the aircraft. For example, the service 150 may use as inputs: (1) an approximate aircraft location compared to a mapping of the airport's terminals, and (2) a lack of movement to determine that an aircraft is parked at a gate. The exact gate may not matter, just the fact that the aircraft is in a "gate state." When movement is detected over a sustained period, the service 150 may generate a gate pushback event. Supplemental information sources may provide additional data as needed. For example, FlightStats.com can be used to determine gate assignments.

The service 150 may compare the derived aircraft state and event information with key Traffic Flow Management (TFM) event times (e.g., EOBT, TMAT, metering times) and calculate a confidence interval and level for those times. The service 150 may transmit the confidence interval and level to the appropriate stakeholders to improve their performance. For example, to improve arrival metering, the ASSET system 100 confidence level of TBFM metering times may be sent to the TMC and airline operations center (AOC). Confidence levels for TMATs may be provided to the departure reservoir coordinator and AOC to avoid missed departure slots. For departures from airports within the freeze horizon to metered airports, the ASSET system 100 may provide advanced notice to the TMC that an aircraft will not make its meter time. This advanced notice allows the TMC to adjust the arrival sequence and avoid "starving" the runway.

Figure 1B:
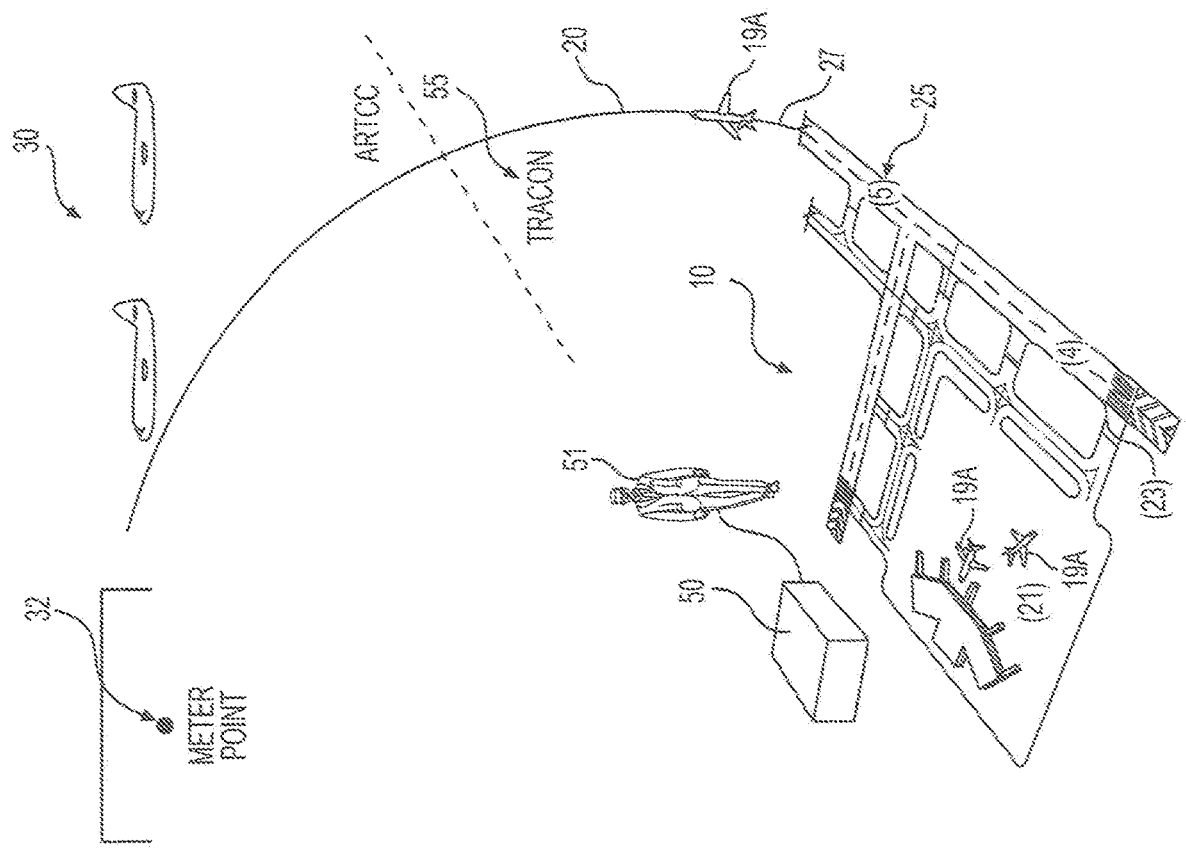
FIG. 1B illustrates a National Airspace System (NAS) environment in which departing aircraft must enter a metered time slot.
Figure 1B:
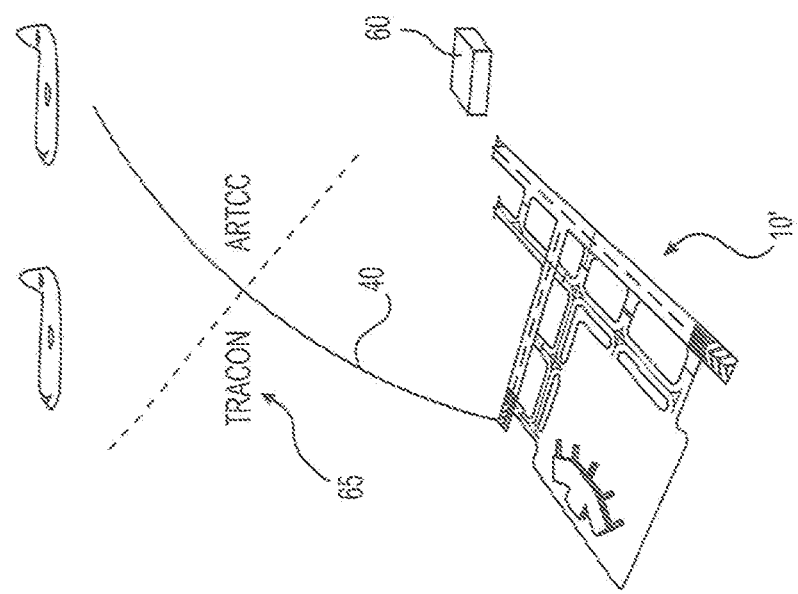
Figure 1C:
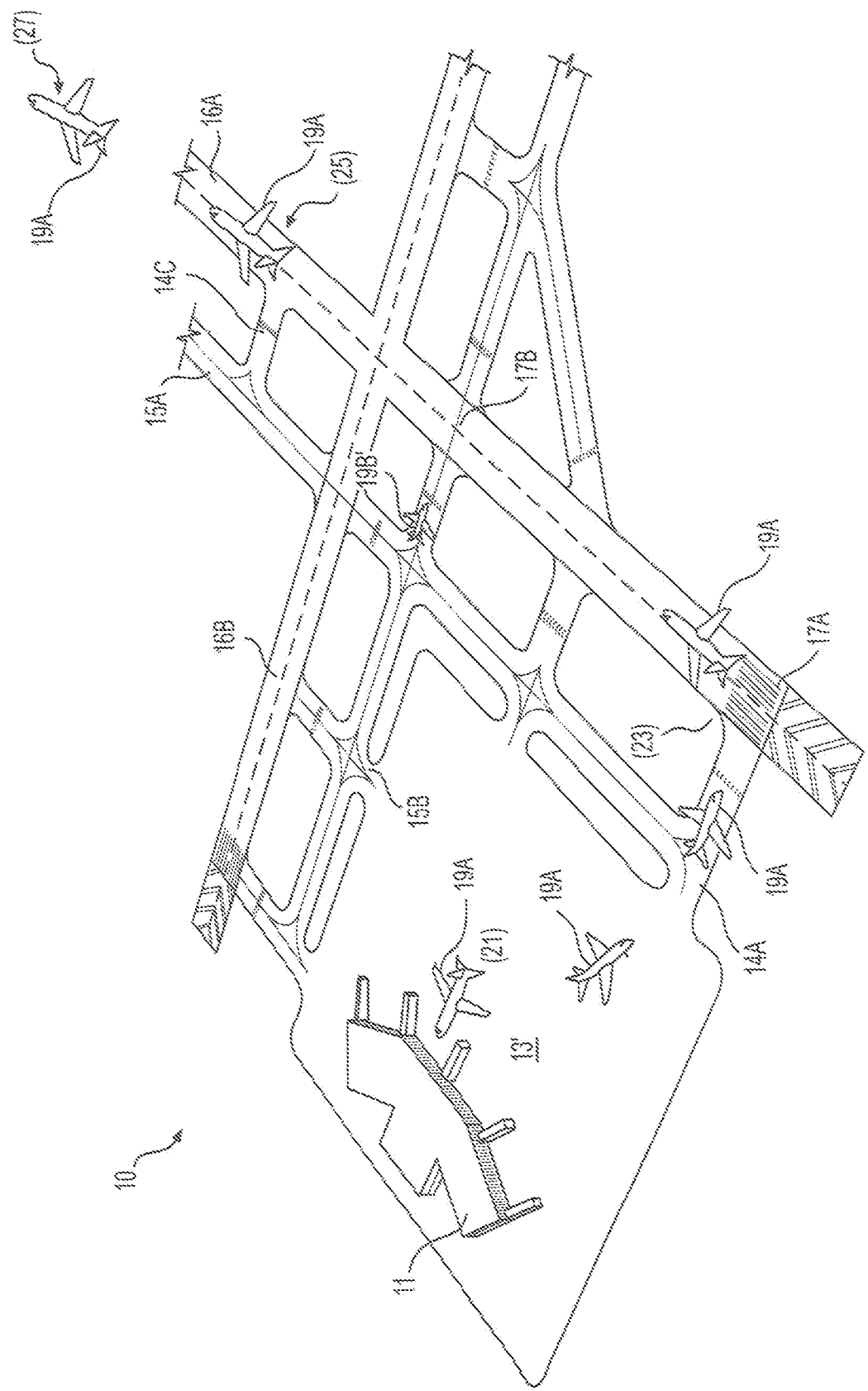
FIG. 1C illustrates an airport environment in which example surface state event track systems, and corresponding methods, may be implemented.
Figure 1D:
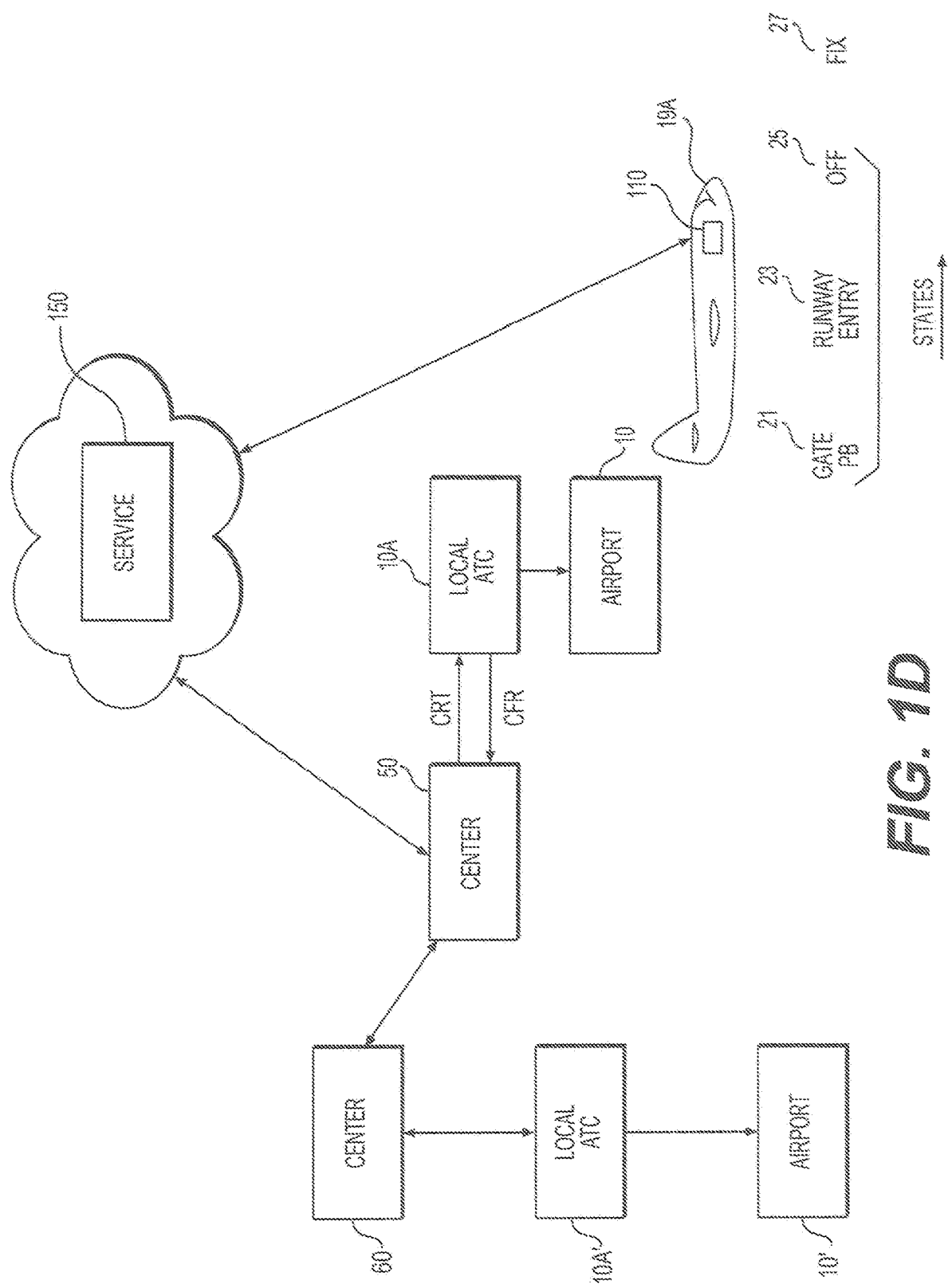
FIG. 1D illustrates, logically, communication flows for departure of a tactically-scheduled aircraft.

FIG. 1B illustrates a National Airspace System (NAS) environment in which airplane 19A departing airport 10 must enter a metered time slot 32 en route 30 to arrival airport 10'. FIG. 1C illustrates the airport 10 in detail. FIG. 1D illustrates a logical flow of information corresponding to airplane 19A's departure from airport 10 and travel to arrival airport 10'.

Figure 2B:
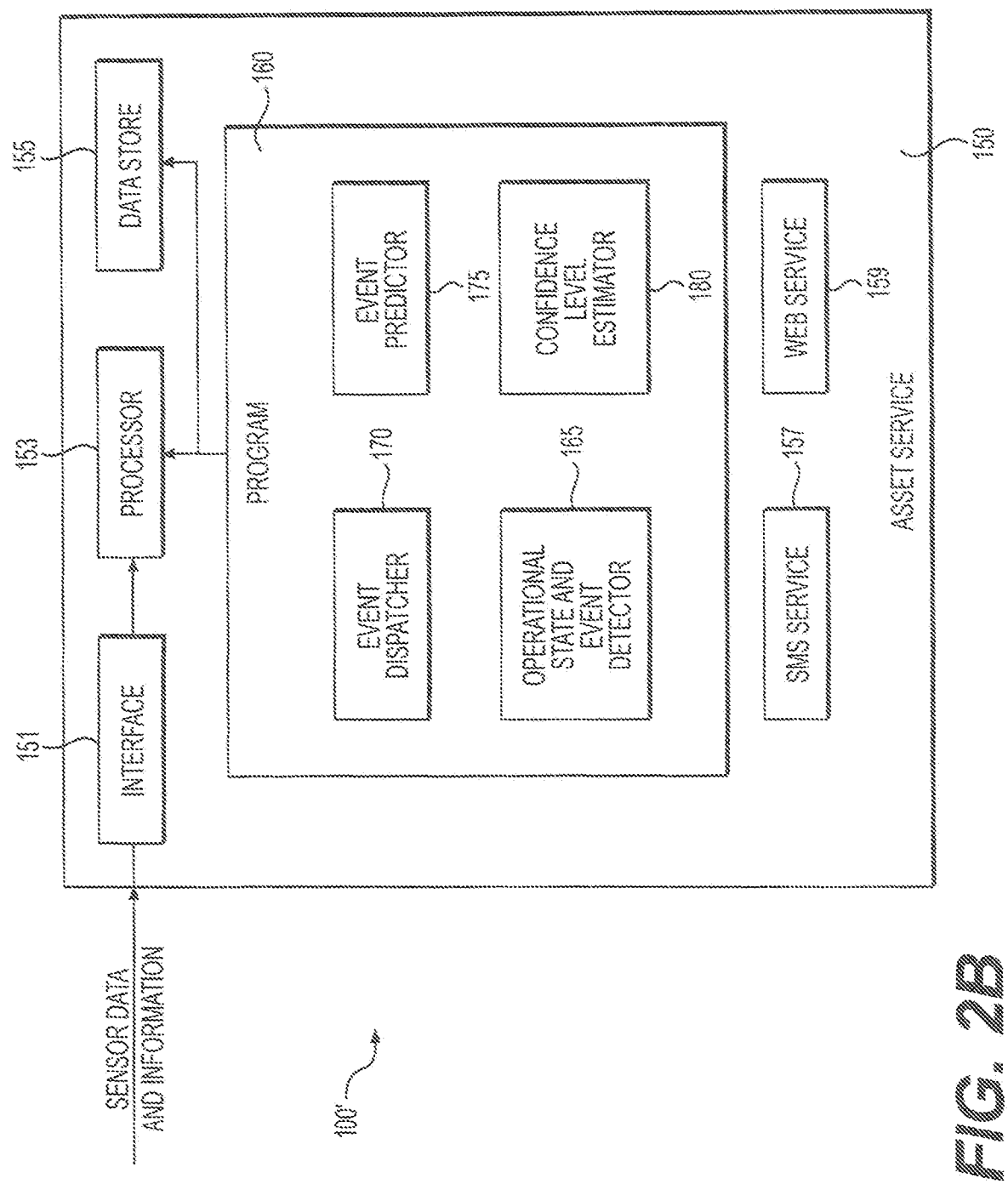
FIGS. 2B-2F illustrate alternate examples and components of a predictive aircraft surface state event track system.

In FIG. 1B, airplane 19A is scheduled to depart airport 10 inside the freeze horizon (i.e., an internal departure) and is given slot 32 within en route stream 30 to TBFM destination airport 10'. Airplane 19A proceeds through several distinct and identifiable events, including, for example aircraft gate pushback 21, runway entry 23, and take-off (OFF) 25 for entry into departure stream 20. During departure, airplane 19A may be under control of Local air traffic control at airport 10, and TRACON 55. Airplane 19A transitions to control in ARTCC 35 and enters en route stream 30, slot 32, at the meter point. If the departure states occur as expected, the TMC's (e.g., TMC 51 at Center 50) confidence that the airplane 19A will merge into the en route stream 30 in the designated slot 32 is increased. If any of the departure events are missed or are late, the TMC 51 (or a TMC at Center 60) may have additional time to change the arrival sequence 40 for the arrival airport 10' to support the internal departure of airplane 19A from airport 10. Aircraft surface state event track system 100 (see FIGS. 2A(1)-2A(3)) provides the Local air traffic control at airport 10, and by extension, the TMCs, an early indication of departure (e.g., gate pushback) and confirmation of departure (e.g., takeoff).

FIG. 1C illustrates airport 10 in which an example aircraft surface state event track (ASSET) system 100 (see FIGS. 2A(1)-2A(3)), and corresponding method, may be implemented. In FIG. 1C, airport 10, which may be typical of many small or mid-size airports, does not include surveillance systems found at large airports, such as surface or ground radar systems and multilateration systems, for example. At airport 10, the herein disclosed ASSET system 100 may provide the sole system for tracking aircraft in non-movement areas. Those non-movement areas include at least the surface 13' (i.e., including a gate area) surrounding terminal 11, at which airplane 19A initially is parked (prior to gate pushback event 21). Also shown in FIG. 1C, airplane 19A moves from the gate area to ramp 14A and stops at intersection 17A before proceeding with runway entry (event (23). Airplane 19A then proceeds with take-off, reaching OFF (event 25) and finally fix (tagged up) event 27, at which point, airplane 19A appears on air surveillance radar. ASSET system Apps 110 (not shown in FIG. 1B) installed on mobile devices onboard airplane 19A (and on each of airplanes 18A, 19, and 19B), transmit signals (raw data and processed data) that may be received by the ASSET system service 150 (also not shown in FIG. 1C). The ASSET system service 150 then may generate an advisory signal and message to alert Local airport control personnel (i.e., at airport 10 and the center 50) as to the status of each of the aircraft and a confidence level that relevant ones of the aircraft will make their target event times (e.g., airplane 19A's OFF time is within schedule).

FIG. 1D shows an example of information flow between and among the airplane 19A, the Centers 50 and 60, Local control at airports 10 and 10', and the ASSET system 100. The airplane 19A implements components of the ASSET system 100, including App 110 installed onboard the airplane 19A in, for example, mobile devices that may comprise a cockpit EFB (not shown in FIG. 1D). Remaining components of the ASSET system 100 are shown, in the embodiment of FIG. 1D, as implemented in the cloud as service 150.

Referring to FIGS. 1D and 2A(1)-2A(3), possible events and corresponding states of the airplane 19A are determined by the service 150 based on signals received, and in some cases processed, through control of the App 110. In an embodiment, the App 110 controls sensors 105 and other components in mobile device 103 to transmit raw signal data to the service 150. For example, the App 110 may control the mobile device 103 to send audio signals picked up by a microphone in the mobile device 103 to the service 150. The App 110 also may control the mobile device 103 to send processed information, such as position information received by a GPS receiver to the service 150. The service 150 processes the received information to determine different events associated with the airplane 19A, and from the events, to determine various states of the airplane 19A. For example, the service 150 may associate a sound track conforming to a signature for a jet engine as an indication the airplane 19A has its engines running, and a change of geographical position as an indication the airplane 19A is moving. The result of these processes is generation of a series of events 21, 23, 25, and 27 along with associated start and stop time for each event. Assuming the airplane 19A is departing the airport 10, the events should follow a general pattern with times that correspond to estimated or scheduled times (e.g., EOBT) for the airplane 19A. The service 150 then may pass the airplane event information to Local air traffic control 10A and to Center 50. The service 150 also may compute a confidence level that each of the events to transition from gate pushback to OFF will occur within the scheduled or estimated times for each of these events. For metered aircraft, the Local air traffic control 10A may communicate with the Center 50 to provide a call for release and receive a Coordinated Release Time (CRT). In an embodiment, the App 110 may perform some of the computations and operations of the service 150.

In the example of FIG. 1D, the departure airport 10 and the arrival airport 10' may be under control of different Centers (50 and 60) and different TRACONs. In this example, the Centers 50 and 60 may communicate regarding the progress of airplane 19A in its ascent to reach its meter point (slot 32 in en route stream 30). Finally, the center 50 may provide meter point data to the Local air traffic control 10A' for airport 10'.

Referring to FIGS. 1A-1C, a specific scenario in which the ASSET system 100 may improve scheduling involves a departing flight at a large airport without ramp surveillance. The aircraft needs to push back from the gate by a known time (based on ramp congestion and historical taxi times) to meet its TMAT. The system 100 operates to determine that the aircraft has pushed back from the gate. Depending on subsequent sensor data, the system 100 determines whether the aircraft pushed back and stopped (i.e., to record an on-time departure) or started to taxi to the spot 23. The system 100 notifies Local flight management personnel and systems that the TMAT appears to be realistic based on this information. The system 100 alerts local flight management personnel and systems when the system 100 predicts the aircraft will miss its TMAT by more than a configurable time, thereby allowing Local flight management personnel and systems to adjust the departure plan and recover the departure slot.

Another scenario involves a large storm system that causes widespread airport capacity reductions and temporarily shuts down a hub airport. Inbound aircraft are diverted to other airports. Some of these airports lack surface surveillance. Some lack gates. The crews shut down the aircraft engines while they wait for the storm to pass. As the aircraft sit on the tarmacs, crew duty-time limits (FAR Part 117) become a concern. The system 100 continues to automatically report the aircraft locations providing the AOC with the basic, but critical, information needed to efficiently recover their operations.

FIGS. 2A(1)-2A(3) illustrate example aircraft surface state event track (ASSET) system 100. In the illustrated embodiment, ASSET system 100 is designed to determine aircraft surface state events based on sensor data received from an aircraft onboard sensor suite, to predict a time from a first aircraft surface state event to future aircraft surface state events, to compute a confidence level and interval that the aircraft's future events occur at the predicted or scheduled time, and to provide appropriate messaging and information to Local and Center flight management systems and personnel regarding the current aircraft surface event and state, future events and states, and the confidence levels associated with those future events. By performing as designed, the example ASSET system 100 allows flight management personnel to assess if designated slots in departure, en route, and arrival streams will be filled by a specific airplane. For ease of description, the system 100 is described as it relates to three specific aircraft surface events, namely, gate pushback, runway entry, and takeoff. However, those skilled in the art will appreciate that the system 100 may be used to monitor, define, evaluate and report any other possible aircraft surface events. Furthermore, the structure and methods of use of the ASSET system may be applied to other environments to monitor and control movement of objects other than airplanes.

In addition, the description may refer to aircraft operating under a tactical departure regime. However, the same or similar concepts would apply to any aircraft departure or arrival process or regime. The goal, in either tactical departure or non-tactical departure scenarios to provide appropriate flight management personnel with information and confidence that a specific aircraft will meet its intended takeoff time and arrive on time at its designated slot in whatever stream that slot exists.

In an embodiment, the ASSET system 100 may operate without any pilot, cockpit crew, or other aircraft crew (collectively, aircrew) actions. That is, the system 100 may operate automatically and autonomously from the perspective of aircrew. Furthermore, in an embodiment, the system 100 may provide no outputs or information to the aircrew. In another embodiment, the system 100 may provide limited outputs and information to the aircrew.

In FIG. 2A(1), aircraft surface state event track (ASSET) system 100 includes ASSET system App 110 and ASSET system service 150. The App 110 is shown installed on mobile device 103, which is a component of electronic flight bag (EFB) 101. The App 110 also may be installed on other mobile devices, including mobile devices that are not components of an EFB. In an embodiment, only one mobile device and one App operate to provide signals and information to the service 150. In another embodiment, the system 100 may use multiple mobile devices and multiple Apps to provide signals and information for a single aircraft to the service 150. The App 110 may receive information from sensors 105 installed in the mobile device 103, including a video camera, GPS receiver, microphone, cellular receiver, accelerometers, and other sensors. For example, the APP 110 may receive periodic GPS position updates from the GPS receiver. The App 110 then may provide the as-received information from the sensors 105 to the service 150. Alternately, the APP 110 may execute to process some or all of the as-received information and the processor 108 may cause the processed information and any remaining as-received information to be transmitted to the service 150.

The service 150 is shown implemented as a cloud-based system, although other configurations and architectures are possible. In this implementation, the service 150 includes interface 151, processor 153, data store 155, SMS service 157, Web service 159, and program 160. The program 160 includes machine instructions that are executed by the processor 153 to implement the function of the ASSET system 100. The program 160 is stored on a non-transient computer-readable storage medium, namely data store 155. The program 160 includes operational state and event detector 165, event dispatcher 170, event predictor 175, and confidence level estimator 180.

FIG. 2A(2) illustrates an embodiment of the ASSET App 110 in more detail. The App 110, which may be implemented as a software program stored on a non-transitory computer-readable storage medium of data store 107, includes the following modules: crew user interface 111, analyst interface 112, health monitor 113, aircraft state detector 114, logger 115, processor interface 116, sensor interface 118, and communications interface 119. The crew user interface 111 allows cockpit crew member 102 to communicate with the App 110. In an embodiment, the crew member 102 may use the interface 111 to manually enter aircraft-specific information such as a flight identifier. However, in another embodiment, flight identifier information may be entered automatically and autonomously by other components of the ASSET system 100. The interface 111 also may be used to display alerts and advisories specific to the ASSET system 100 such as health monitor alerts, ASSET system status (e.g., ASSET system 100 on-line or off-line, or transmitting. However, the ASSET system 100 is intended and is designed to provide automatic, autonomous operation (i.e., generally without crew input), and further is intended and designed to not detract crew member attention. Thus, in an embodiment, the ASSET system 100, and its App 111, may operate with little or no input from or output to the cockpit crew.

An analyst interface 112 allows analyst 104 to access settings needed to support testing and demonstration including parameters needed to connect the App 110 to the ASSET system service 150, sampling rates for various sensors, and aircraft state transmission rates.

Health monitor 113 may execute to provide an alert indicating the status of the ASSET system 100 and the accuracy of ASSET system outputs. The alert may be generated onboard the aircraft (e.g., by the mobile device 103) or at the ASSET system service 150. Such alert may be made available (displayed) onboard the aircraft (e.g., to the cockpit crew) and to other entities and personnel in the air traffic control system. The health monitor 113 may begin operation by verifying the quality of data input to the App 110 as well as verifying the App 110 is operating with sufficient reliability by, for example, detecting or receiving and using indications of reductions in available aircraft system resources that could affect the accuracy of the output of the service 150. When the health monitor 113 or the service 150 indicates a reliable operational state, the App 110 may provide a system "online" alert that is displayed in the cockpit and through the service 150 to flight control personnel. If a reliable operation state cannot be confirmed, the App 110 and/or the ASSET system service 150 may suppress the online alert and instead may display an ASSET system "offline" alert. Thus, if the ASSET system is not operating reliability, aircraft event and state information may not be generated and thus may not be released to flight control personnel. In this way, the health monitor 113 minimizes the chance that insufficient or inaccurate information might be used in predicting events and determining confidence levels. Thus, the health monitor 113 determines that a signal received by the ASSET system service 150 from the App 110 is of sufficient quality so that the ASSET system service 150 operates to produce a reliable and accurate aircraft event/state prediction. The health monitor 113 is shown in more detail in FIG. 2A(3).

The aircraft state and event detector 114 uses aircraft operating data and other information to detect aircraft events and determine aircraft operational states. The detector 114 may cooperate with logger 115 to maintain recent event and state data in data store 107, and may use the stored data to detect future aircraft events and determine future aircraft operational states.

The logger 115, in addition to cooperating with the detector 114 as noted above, may log, in data store 107, other aircraft and flight information for a current departure, current arrival, or an entire flight.

The processor interface 116 allows components of the App 110 to be executed by a processor located in the mobile device 103 or another local processor. Some computations may be performed locally (on the aircraft) to reduce data transmission bandwidth to the system service 150. For example, sensor data received from sensors located in the mobile device 103 may be processed by processor 108 executing the detector 114.

The sensor interface 118 executes to receive sensor data from sensors 105, and in some situations from sensors external to the EFB 101, such as sensors 109.

The communication interface 119 provides a link to the system service 150, allowing aircraft state and event data, health monitor alerts and status, as well as other information, to be transmitted using one or more of a cellular connection, a wireless connection (Wi-Fi) or through a hardwired connection to an onboard aircraft communications mechanism such as VHF or SatCom.

Returning to FIG. 2A(1), the service 150 receives and stores inputs that include airport data, aircraft data, signals data, airplane information, health monitor data, and flight management data, and outputs such as advisories, alerts, and messages to AOCs and other airport and airline management systems and personnel. The airport data include a map of the airport 10. The signals data include information and data such as GPS positions received from the mobile device 103. The signals data also may include signals data from sources external to the EFB 101, including sources external to the airplane, such as signals data from sensors 109 that are external to the EFB and/or external to the airplane. The airplane data may include aircraft identification and flight number as assigned by the airline. The aircraft information may include design and configuration information for various aircraft types that may use the airport 10, including, for each aircraft type, number of engines, sound signature for the engines, operational characteristics, and other information. The health monitor data may include an indication, in the form of an alert or advisory, of the quality of data available to the App 110. The health monitor data may include an online or an offline indication when data quality is evaluated at and by the App 110. The flight management data may include EOBT, TMAT, and other time-based estimates assigned to a specific flight so that the flight reaches its meter point on time. The output alerts and messages include aircraft event and state messages such as a gate pushback event message and a confidence level that the next aircraft event (in this case, for example, runway entry) is achieved on schedule.

In addition to storing the program 160, the data store 155 may store airplane information for aircraft that may operate out of the airport 10. The data store 155 also may store flight management data for a specific flight. The data store 155 may store completed flight data such as actual time off block, OFF time, and other data to be used in system performance evaluation processes and airline, airplane, aircraft, and flight crew evaluation processes.

The operational state and event detector module 165 analyzes signals information (raw and processed) received from airplane 19A to determine (detect) the status of airplane 19A, and more specifically, the occurrence of an event and as appropriate, a corresponding state of airplane 19A. For example, the module 165 may receive a sound signature recorded by the microphone on the mobile device 103 and sent to the service 150. Most commercial aircraft use jet engines; a few use jet engines to drive a propeller, and still fewer use a cylinder and piston arrangement to drive a propeller. Jet engines have a characteristic sound signature that is known or knowable. Different jet engines have different sound signatures. The mobile device microphone 125 may acquire or record the sound associated with jet engine start and low speed operation and provide this sound recording to the service 150. The module 165 may include programming that when executes, allows processor 153 to compare the sound signature to specific airplane data (i.e., the sound signature for the specific make and model of the installed jet engines) for the airplane 19A and may determine the airplane 19A engines are at idle or are operating at a sufficiently high RPM that the airplane 19A should be moving on the surface of the airport 19A. Alternately, and in the absence of a jet engine sound signature for comparison, the module 165 may be used to compare the recorded sound signature to a generic jet engine sound signature to determine possible aircraft operation. The module 165 may be used to detect engine speed changes that indicate the airplane is beginning to taxi, or is slowing and stopping. Using recorded sound signatures in comparison to known sound signatures allows the module 165 to be used to determine possible engine operation. The identified possible engine operation then may be used, as appropriate, alone or in combination with other information, to assess aircraft state.

The module 165 receives a stream of inputs from other modules of the service 150 and executes a repetitive operation to determine if enough data are available to determine if the airplane 19A is progressing toward, has reached, or is leaving a specific aircraft state event. If the aircraft event is gate pushback, indications that the airplane 19A is approaching this event include a noise signature for jet engines of the airplane 19A, an access door closed sound recording and/or a recording of a flight public address announcement recorded public that the access door is closed, and ancillary recorded announcements. Gate pushback also may be signaled by signals from the accelerometers, GPS signals, and other information. For example, with these sensors, the module 165 may compute acceleration, speed, and direction of motion for airplane 19A, as well as yaw and yaw rate when airplane 19A is turning. These aircraft direct motion sensor data then may be combined with other data indicative of aircraft state, including the previously mentioned noise data (engines, brakes, door operations). The module 165 logic may include a simple algorithm in which each of the possible inputs is weighted, and once a total value is reached, the module 165 declares the airplane 19A has reached a specific state event, in this example, gate pushback. Such weighting may be based on the data source, its expected reliability, frequency of data collection for each source, and other factors. In addition to sensor data, the module 165 may include airport data from a moving map or similar data source and other data for an airport including terminal locations, and distances to ramps and runway entrances. The module 165 further may include atmospheric data such as airport altitude, temperature, wind speed. Still further, the module 165 may account for wind shear and trailing vortices caused by preceding flights, particularly larger aircraft that demand a greater flight-to-flight separation. In an aspect, the module 165 may produce a first estimate based on minimal data, such as direct motion data as well as one or more additional estimates using other data available to the ASSET system 100 such as airport map data, aircraft noise data, and other aircraft and airport data. The module 165 then may compare the two or more estimates tor determines if any differences are significant. Such comparison may be performed "off-line" so as to minimize the computational load on the service 150.

The event dispatcher 170 sends detected events and optional airplane state information to subscribed clients including the AOC, airlines, and Local air traffic control, for example. The event dispatcher 170 may use the Web services module 159 to send the event and state information. The event dispatcher 170 also may send event and state information using short message system (SMS) service module 157.

The event predictor module 175 uses historical and current state and event data to predict when a future event will occur for an active flight. The event predictor module 175 may execute to produce an event time estimation by which module 175 estimates or predicts a time at which the airplane 19A will reach its next aircraft event; for example, the time from gate pushback to runway entry, and the time from runway entry to aircraft takeoff. The module 175 may base this information on specific airport data such as length of a taxiway from the airplane's position at gate pushback. The module 175 alternately or in addition, may base this time estimation on historical averages, recorded in data store 155, for such movements. TOBT compared to engine start signal, door closed sound (which can be heard by a microphone on mobile device 103), cabin announcement of door closed, can be used to determine if gate pushback will occur at the target time.

The event predictor module 175 may incorporate machine learning processes to model the sequence of taxi events from historical data and predict the next event in the aircraft's trajectory give the current state. For example, to predict the time of the next event for an aircraft, probability distributions of the time interval between each event (e.g., gate-runway transit time) may be used to estimate the next event time (e.g., takeoff times of departures). Such distributions may be conditioned on factors found to influence transit time probability, such as the particular airport terminal/gate and runway of the aircraft, or proxies for traffic level (e.g., time of day). As an alternative, regression models of gate-runway transit time may be used to predict the next event time. Models may be constructed using machine learning techniques such as K-Nearest Neighbors or Logistic Regression to capture the dependency of transit time on factors found to influence transit time, such as gate, runway, destination airport, aircraft type and/or others.

The module 175 may include in its operation, atmospheric data such as airport altitude, temperature, wind speed. Still further, the module 175 may account for wind shear caused by preceding flights, particularly larger aircraft that demand a greater separation. In an aspect, the module 175 may produce a first estimate based on minimal data, such as direct motion data as well as one or more additional estimates using other data available to the ASSET system 100 such as airport map data, aircraft noise data, and other aircraft and airport data. The module 175 then may compare the two or more estimates tor determines if any differences are significant. Such comparison may be performed "off-line" so as to minimize the computational load on the service 150.

In making the above comparisons and time estimations, the modules 165 and 175 may refer to historical data. Generally, all comparisons and time estimations may be based on data specific to the departure airport (i.e., airport 10) (or in the case of arrivals, the arrival airport 10'). In addition, the comparisons and estimations may involve more granular calculations, and the comparison and time estimation algorithms may be modified to account for the following, non-inclusive, list of factors: the specific airline; the specific flight of the specific airline; time of year, time of day, season, holidays; weather; flights to specific airports (e.g., ORD, EWR); airport maintenance and system upgrades in progress or completed; and age of the aircraft.

To support the evaluation of state and event predictions, the ASSET system 100 includes ASSET Analysis Toolkit 130, with tools that provide analyst 104 with the ability to visualize the trajectories and estimated states/events with respect to the airport, methods for evaluating the state and detection estimates. Visualization support may involve generating KML formatted output for importing into Google Earth, for example. Computational evaluation methods may include holistic, trajectory-based assessment of the sequence of states and events.

The confidence level estimator 180 executes to perform various statistical and probability calculations and provide the results of the calculations in various format to personnel and systems involved in air traffic control. In an embodiment, the module 180 computes a confidence interval (for given confidence levels) that each designated event in airplane 19A's departure sequence will be reached within a specified time—i.e., EOBT at noon, TMAT at 12:10, OFF at 12:15, plus or minus any windows. For example, the module 180 may compute 95% confidence intervals for OFF times given historical data. If airplane 19A's progress toward takeoff falls outside the computed confidence level, the service 150 may notify Local and Center flight management systems and personnel.

An example of one statistical process involves determining confidence levels associated with an OFF time for airplane 19A. Assume airplane 19A is assigned daily flight number 202 from airport 10 to airport 10'. Flight 202 makes its OFF time of 12:15 with the following variances, for ten consecutive days: (−20 seconds (1)); (−5 seconds (1)); (+15 seconds (4)); (+45 seconds (1)); and (+120 seconds (3)). The mean OFF time is 12:15 plus 44 seconds, and the standard deviation is 19.899 seconds. If the desired confidence level is 95%, the acceptable confidence interval is 44+/−2.989 seconds. That is, flight 202 will achieve an OFF state at 12:15:44+/−2.989 seconds with a 95% confidence level.

The confidence level estimator 180 may execute more complex algorithmic operations such as, for example, computing the Bayesian probability that airplane 19A will meet its CRT given flight 19A achieved gate pushback at its EOBT; probability airplane 19A will meet its CRT given flight 19A meets its TMAT; probability airplane 19A will meet its TMAT given airplane 19A meets its EOBT; etc. To improve estimations and predictions, the service 150 may incorporate machine learning techniques.

The service 150 may execute its various operations in real time or near real time. That is, for example, the service 150 may compute gate pushback within, for example, two seconds after events indicating gate pushback has or is occurring, and may compute a confidence level of the remaining designated aircraft departure events of airplane 19A within the same two seconds. The service 150 then may provide a gate pushback event message and confidence intervals for remaining aircraft states to Local air traffic control 10A and Center 50 traffic control.

The ASSET system 100 provides an efficient and accurate indication of aircraft surface events, which may be particularly useful during off-nominal situations like weather triggered diversions to other airports. The system 100 may output information that allows air traffic management personnel and systems to track aircraft surface movement in the absence of dedicated non-movement area surface surveillance systems. Different surface state event track applications and different categories of airports may require different aircraft events and states. Departure metering at large airports without ramp surveillance may only need gate pushback and taxi start/stop events, while arrival metering may gain the most benefit from movement area entry and takeoff events occurring at small airports. The system 100 preferably uses aircraft data that can automatically be determined from mobile devices. While sensors in EFBs and other mobile devices provide a core element of the aircraft surface state event track system 100, the system 100 may use any available sensor data, but preferably data that are accurate, quickly accessible, and readily and rapidly transmitted. For Portable EFBs, the system 100 may use temporary connections the EFBs may have with the aircraft (e.g., GPS, datalink). The system 100 includes App 110 that can access sensor data (e.g., location) and transmit it to the service 150. The service 150 receives and logs data from the App 110. The App 110 also may log the sensor data it accesses and transmits. Once the data are received by the service 150, the service 150 can analyze the data to determine aircraft events and states. One concern is possible latency of the cellular network for the various situations and vehicle states. A few seconds of latency should not be a problem for most detected events, but a delay of 30 seconds or a minute or more could be. The data may be supplemented with additional information regarding aircraft events such as, for example, engines on, gate pushback, taxi start, taxi stop, spot out, wheels off, wheels on, runway exit, spot in, gate arrival, engines off. Some of these events require supplemental information such as airport surface maps (including gate, spot, and runway locations). The system 100 will not necessarily need the aircraft's precise location relative to specific airport resources such as gates, ramp areas, or holding spots. The system 100 instead may use an approximate location and when the location changes beyond a configurable amount. This threshold may be set low enough to provide meaningful updates and high enough to minimize telecommunications costs. Likewise, updating taxi velocity information improves the accuracy of the prediction of whether an aircraft will meet its off-time, but the costs of increased updates must be weighed against the associated improvement in accuracy. While event and state change information, such as gate pushback, alone provides a good indication as to whether a flight will make its TMAT or takeoff window, a confidence parameter (level, interval) may provide a more quantitative indication of the probability these events will be achieved at the desired time. For a large airport with a lot of surface traffic computing a takeoff time is a challenging problem. A more feasible use of the aircraft surface state event track system 100 could be to predict a takeoff time at a small airport where the TMC has little to no information about the aircraft surface state. Estimating taxi out time at a small airport is inherently easier than a large airport. Likewise, at a large airport estimating TMAT confidence intervals is easier than estimating takeoff time confidence intervals. Each air traffic management application may involve use of statistical and probabilistic methods that are appropriate for predicting key future aircraft surface states.

The ASSET system 100 may incorporate health monitor 113, which ensures the ASSET system 100 performs with sufficient accuracy and minimal latency. The health monitor 113, an example of which is shown in FIG. 2A(3), may produce an alert indicating the status of the ASSET system 100, and more particularly the App 110 and the accuracy of ASSET system outputs. Such alerts may be made available onboard an aircraft (e.g., to the cockpit crew) and to other entities and personnel in the air traffic control system. The health monitor 113 may begin operation by verifying the quality of data input to the ASSET system 100 as well as verifying the ASSET system 100 is operating with sufficient reliability by, for example, detecting reductions in available aircraft system resources that could affect the accuracy of the data received at and processed through the App 110. When the health monitor 113 indicates a reliable operational state, components of the ASSET system 100 cooperate to produce an ASSET system "online" alert (or indicator) that optionally is displayed in the cockpit. If the alert cannot be provided reliably, the ASSET system 100 may suppress the alert and instead may display an ASSET system "offline" alert or indication. The health monitor 113 determines that a signal received at its front end is of sufficient quality so that the ASSET system 100 may use the signal to produce reliable and accurate outputs and indications related to events in an aircraft's departure and arrival sequence. In addition, the App 110 may receive other signals, including GPS signals from an onboard GPS antenna. As an alternative to receiving GPS signals, the App 110 may receive ownship position data from an existing ownship GPS system (i.e., a GNSS). If signal quality or internal health are not sufficient, the ASSET system 100 may provide an offline signal as an alert to cockpit flight crew; if signal quality is sufficient, the system 100 may provide an online signal to cockpit flight crew. The alert and the online signal may be provided in the form of a light—e.g., an alert (offline) red light and an online green light—see FIG. 2E. In addition, if signal quality is not sufficient, the system 100 may not produce an output. The health monitor 113 executes to assess the quality of ASSET system input data, the quality of information derived or computed from the input data, and the quality of the ASSET processing at mobile device 103. If any of these quality determinations is unsatisfactory, the ASSET system 100 may "take itself offline." For example, if a threshold for processor utilization rate of processor 108 exceeds a threshold value, the ASSET system 100 may take itself offline. Similarly, the monitor 113 may monitor media device 103 internal memory utilization to determine if that internal resource is below a threshold such that the quality of the ASSET system 100 output could be compromised. Any monitorable factor that could lead to degraded service is in scope of the health monitor 113. Thus, the health monitor 113 ensures that the ASSET system 100 performs with sufficient accuracy and minimal latency. The health monitor 113 verifies the quality of data inputs and detects reductions in available mobile device resources that could affect the accuracy of the ASSET system 100 output. When the health monitor 113 indicates a reliable operational state, the ASSET system 100 displays a system "online" indicator in the cockpit. If the output cannot be provided with sufficient quality, the advisory signal may be suppressed and a system "offline" indication or another alert may be displayed to the pilot instead. In FIG. 2A(3), health monitor 113 is seen to include input module 113a, signals analysis module 113b, data processing module 113c, health signal generation module 113d, and output module 113e. The input module 113a receives signals such as sensor data from a signal source (e.g., sensor 105), identifies the signals (sensor data) and their source (one of sensors 105), and may perform pre-processing steps to provide the proper signals (sensor) information for use by the signals analysis module 113b. In the case of sensors, the signals analysis module 113b receives the processed sensor information and determines if the sensor data possess the requisite qualities to allow accurate and reliable ASSET system 100 outputs (i.e., within a threshold accuracy value). The signals analysis module 113b may provide a binary output—either the data quality is satisfactory or it is not. Alternately, the signals analysis module 113b may provide a more nuanced output; for example, the signals analysis module 113b may classify the signals as unsatisfactory, degraded, and satisfactory, or may provide a percentage score for data quality and reliability, from zero percent to 100 percent. The data processing module 113c may execute to allow processing of input data at the App 110 so as to reduce the data bandwidth associated with sending an output from the App 110 to the service 150, and to speed processing of the time-sensitive ASSET system output. The health signal generation module 113d receives an indication of signal health from the signal analysis module 113b, and determines if the signal health indication is sufficiently reliable to use the signal received at the input module 113a in generating an event indication. If the signal is determined to be sufficiently reliable, the module 113d sends an instruction to the output module 113e. The output module 113e executes to provide a system online alert for display to air traffic control personnel and optionally in the cockpit. The health monitor 113 may execute during start-up of the ASSET system 100, and periodically thereafter. The health monitor 113 may execute to test the capabilities and operational status of various components of the ASSET system 100. The health monitor 113 may provide alerts (visual alerts, text messages) to indicate all ASSET system components are operational or that one or more ASSET components are faulty.

In executing its designed functions, the ASSET system 100 differs from current, non-surveillance tracking systems such as ACARS, which attempt to determine aircraft surface movement and position based on complex algorithms that never receive ground-truth signals, and, as a result, are prone to significant errors and inaccuracies.

In an alternate embodiment (see FIG. 2B), an aircraft surface state event track system 100' comprises only the ASSET system service 150. In this embodiment, the aircraft surface state event track system 100', and specifically the service 150, relies on whatever signals might be received from mobile devices operating in an EFB or otherwise operated by cockpit personnel. Otherwise, operation of the aircraft surface state event track system 100' is the same as that of the system 100.

Figure 2C:
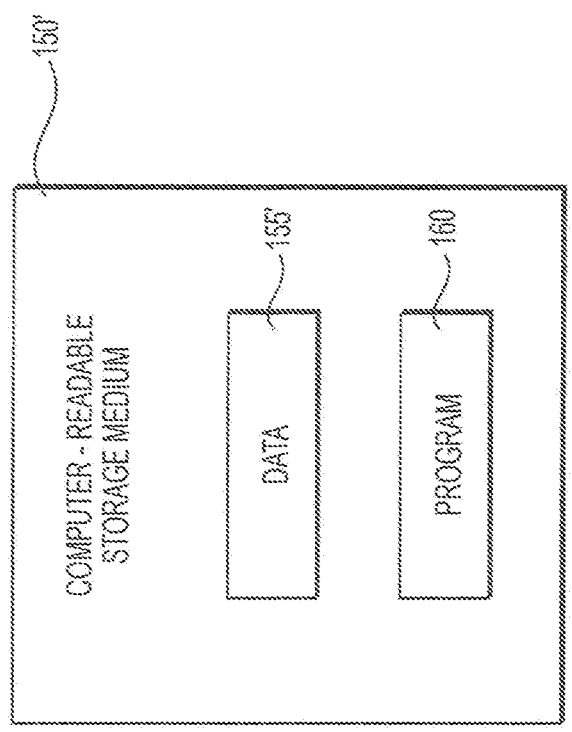

In yet another alternative embodiment (see FIG. 2C), an aircraft surface state event track system 100" comprises a non-transitory, computer-readable storage medium 150' on which are encoded data 155' and programs of instruction 160, the instructions when executed by a processor, causing the processor to perform the operations disclosed above with respect to the service 150 of the system 100.

Figure 2D:
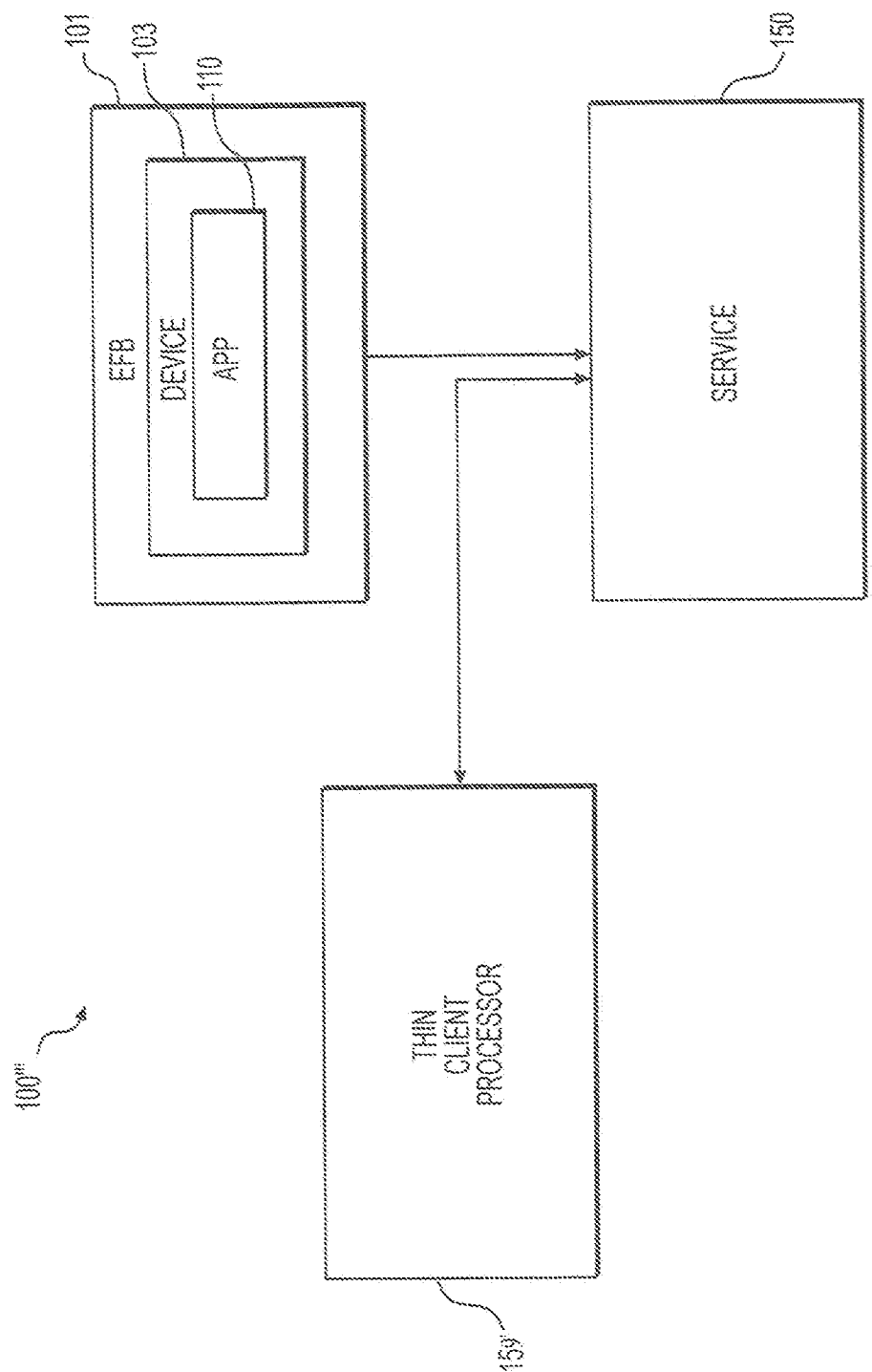

In still another alternative embodiment (see FIG. 2D), an aircraft surface state event track system 100''' may include appropriate software and hardware components installed at Local airports and at Centers that allow the airports and Centers two-way communication with the service 150. For example, the system 100''' may include a thin client program 159' that a flight manager at a Center 50 may use to query the service 150 and to receive replies from the service 150.

Figure 2E:
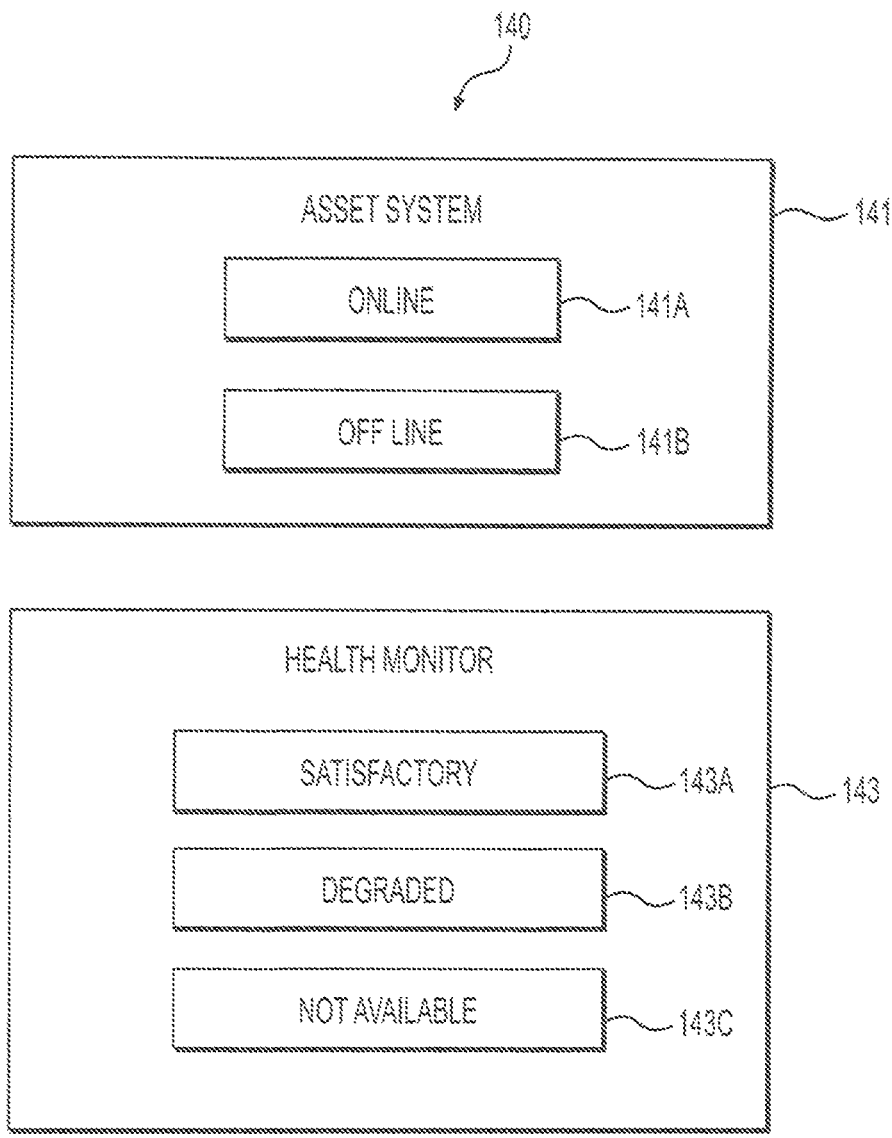

FIG. 2E illustrates an embodiment of an optional electronically-implemented visual alert and self-monitoring display system 140 incorporated into the ASSET system 100. FIG. 2E illustrates system 140 having two different displays: display 141 and 143. The displays 141 and 143 may be implemented using two separate display devices having separate hardware components. Alternately, the two displays 141 and 143 may be provided on a common screen, with one display showing at a time, or in a split screen mode with both displays showing. Display 141 provides a visual alert that the ASSET system is either online 141A or offline 141B. Alternately, display 141 may provide only an online alert; if the online alert is not provided, the ASSET system may be presumed to be off line (i.e., powered down or turned off). The online 141A and offline 141B alerts may be provided as a lighted component (e.g., a green online light). The health monitor status display 143 may provide one of three indications: satisfactory 143A, degraded 143B, and not available 143C. A satisfactory alert is provided at display 143 when the health monitor 113 determines that the quality, latency, and availability of sensor data and other required data and information has reached or exceeded an adjustable satisfactory data threshold value. A degraded alert is provided at display 143 when the health monitor 113 determines the sensor data and other data and information are useable, but that the data could affect the reliability of the event predictions predicated on that data above a configurable base threshold but below the satisfactory data threshold. A not available alert is provided at display 143 if the data are below the configurable base threshold. The data may be below the configurable base threshold if estimated data errors are too large and/or data latency is too large. When the data are of a poor enough quality to generate the not available alert, the health monitor 113 may signal other components of the ASSET system 100, which may take the ASSET system 100 offline. When provided as visual alerts, the online and offline indications may be provided, for example, as green and red waring lights, respectively.

Figure 2F:
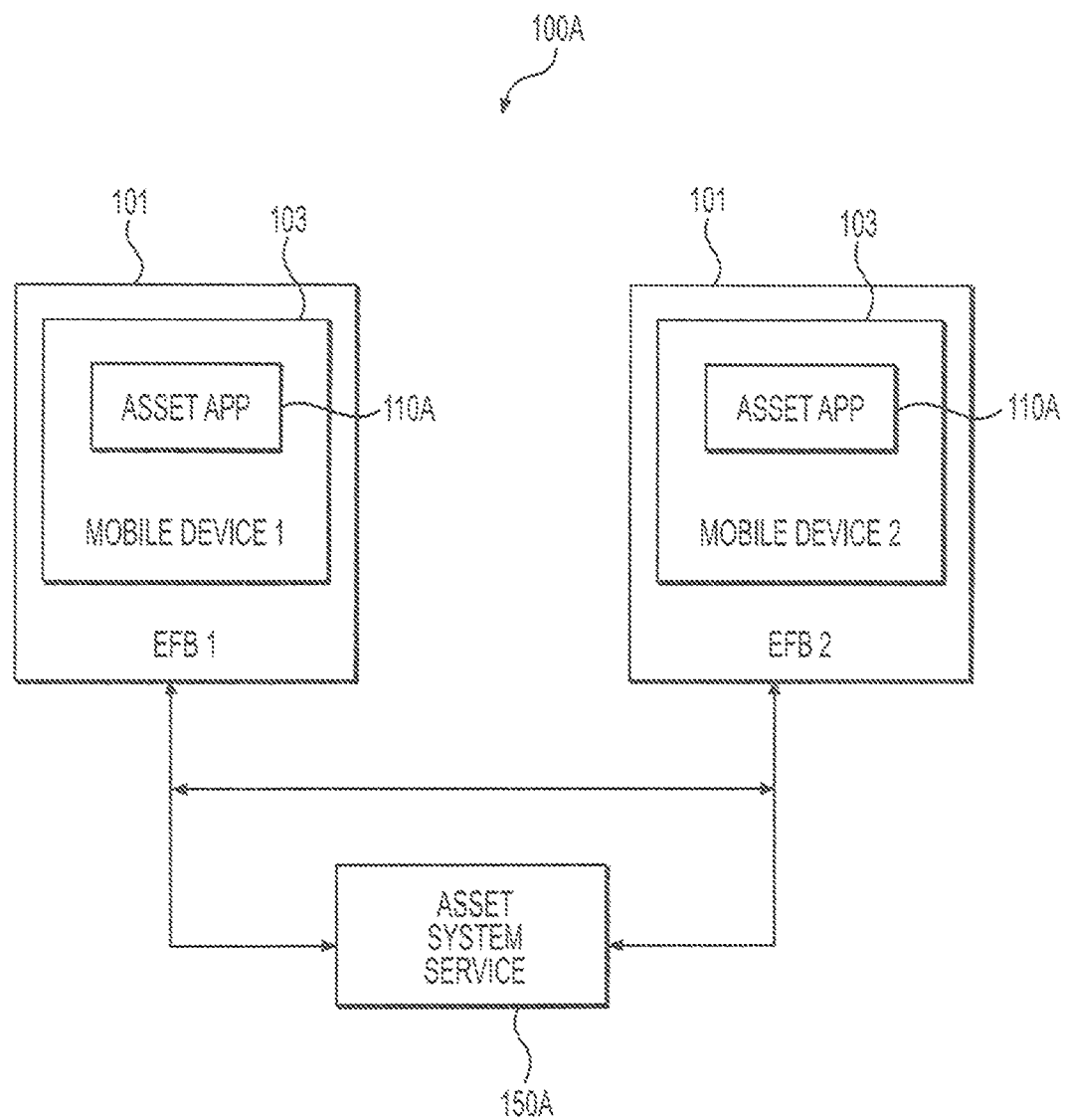
Figure 3A:
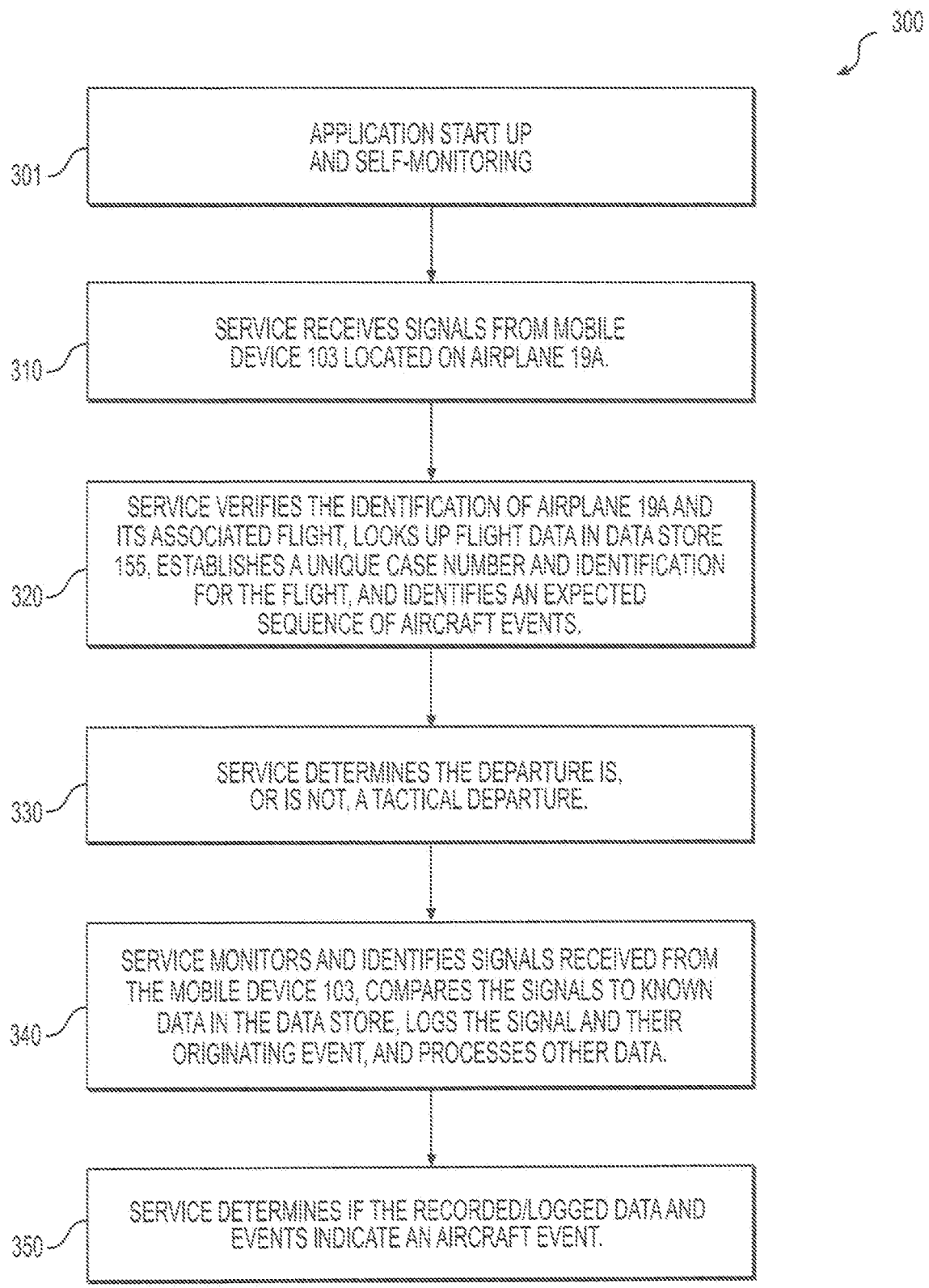
FIGS. 3A-3C illustrate example methods executed by the predictive aircraft surface state event track systems of FIGS. 2A(1)-2F.
Figure 3B:
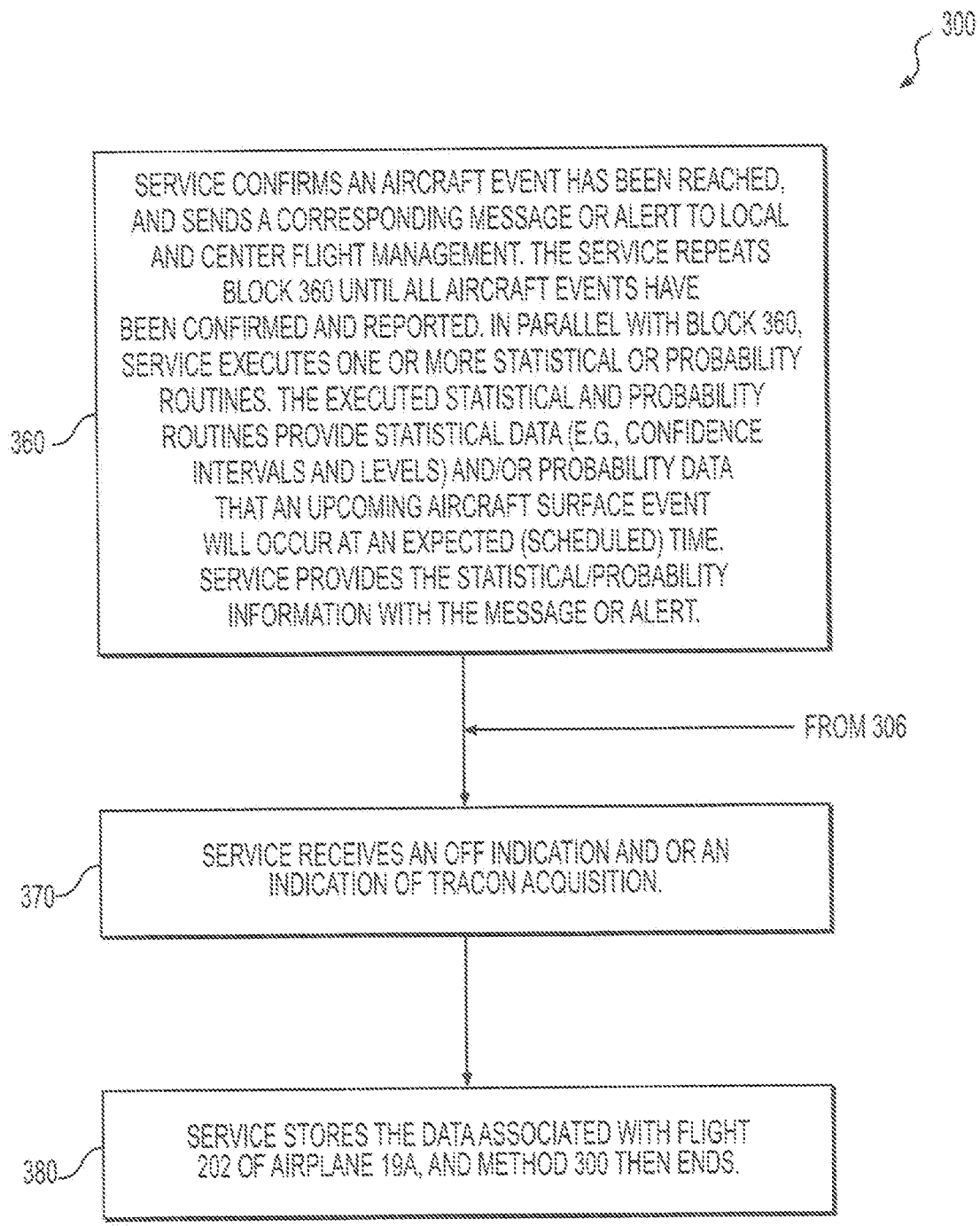
Figure 3C:
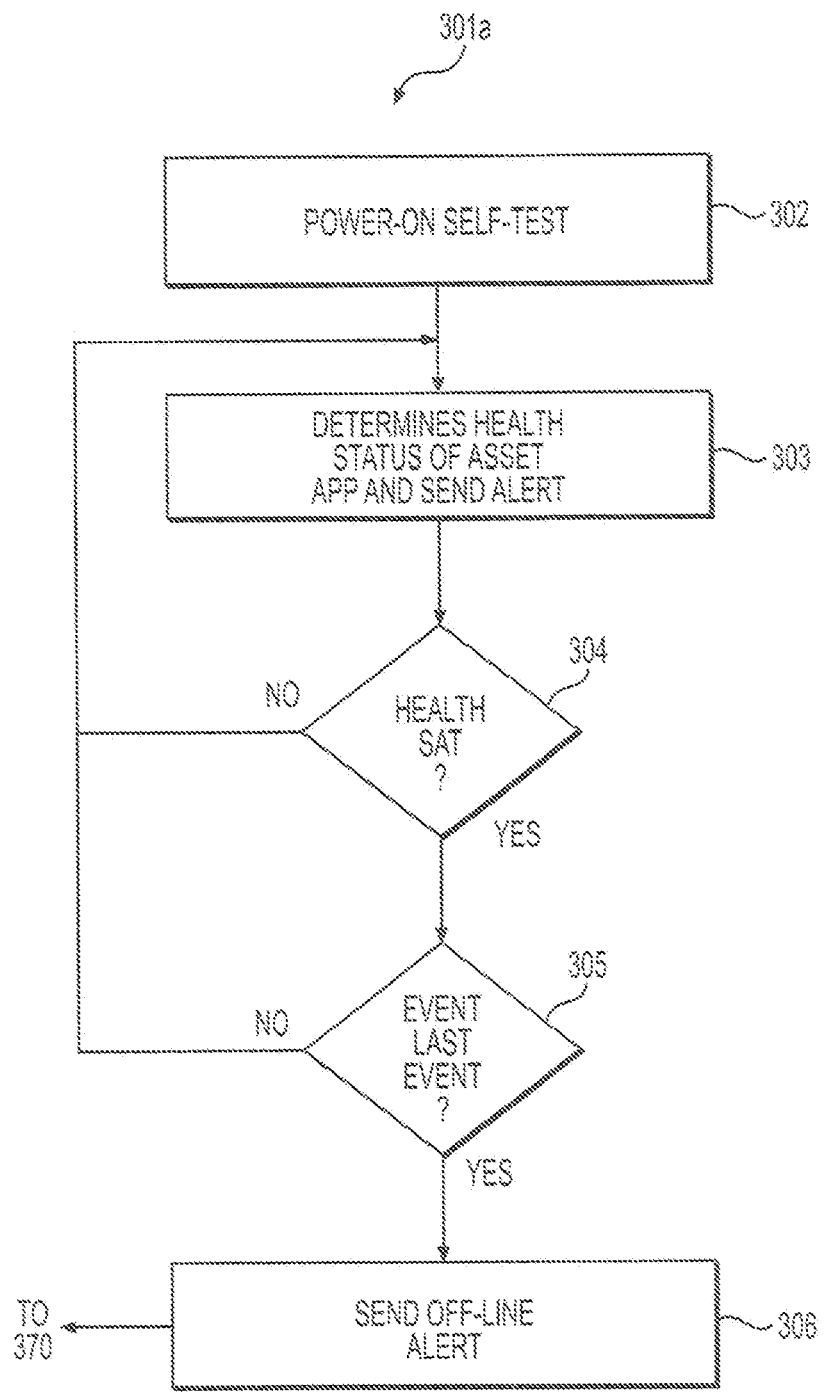

FIG. 2F illustrates yet another alternate configuration of an ASSET system. In FIG. 2F, ASSET system 100A employs two ASSET Apps 110A. Each App 110A is installed in a separate mobile device 103 and a separate EFB 101. Each App 110 may include additional programming (not shown) to control data flow to the ASSET system service 150A. The ASSET system service 150A then includes additional programming (not shown) to accept dual inputs and/or to arbitrate between the two Apps 110. In this configuration, the ASSET system 100A, and in particular the Apps 110A, may operate using multiple protocols. A first protocol limits reporting from only one of the Apps 110A to the service 150A in order to reduce transmission bandwidth and speed data delivery and to eliminate duplicate reporting. A second protocol uses peer-to-peer communication between the Apps 110A to compare and assess the quality of sensor data from each App 110A. The App 110A with the highest quality sensor data (as measured, for example by the associated health monitor 113) then may be used to provide data to the service 150A. A third protocol involves one App 110A being designated as a primary App and the other App 110A being designated as a backup App. This protocol may include automatic failover if the primary stops communicating or fails to achieve accuracy thresholds, FIGS. 3A-3C illustrate example methods executed by the aircraft surface state event track systems of FIGS. 2A(1)-2F. The disclosed example methods relate to a flight of airplane 19A from airport 10 to airport 10'. More particularly, FIGS. 3A-3C illustrate example methods executed by processor 108 of mobile device 103 and processor 153 to determine and track aircraft events and corresponding operational states during departure of airplane 19A. As noted herein, a similar method would apply to arrival of airplane 19A at airport 10'. In FIG. 3A, method 300 begins in block 301 with startup of the ASSET system 100, including startup of service 150, if not already in operation, and startup of one or more Apps 110. Startup of an App 110 includes an internal self-test and execution of health monitoring module startup functions. These startup operations are discussed in more detail with respect to FIG. 3C. Following the startup operations, the method 300 moves to block 310 in which the service 150 receives signals from mobile device 103 located on airplane 19A. The received signals include alerts related to operation of the App 110 as determined by the associated health monitor 113; sensor data from the mobile device sensors 105, and external sensors 109; and other information acquired through the mobile device 103. In addition, the service 150 may receive data, including sensor data from devices external to the associated EFB 101. These sensor data may include data such as aircraft yaw and yaw rate (indicative of airplane 19A turning); aircraft acceleration, speed and direction of motion (derived, for example, from accelerometers, compasses, and GPS systems, for example. In an embodiment, the processor 108 computes the values of speed and direction for example, and provides those processed signals to the service 150. In another embodiment, the App 110 provides raw signal data to the service 150, where the processor 153 generates the values of speed and direction. The operation 300 then moves to block 320. In block 320, the service 150 verifies the identification of airplane 19A and its associated flight (e.g., flight 202 from airport 10 to airport 10'). The verification may include a lookup by a search device executing on processor 153 of flight data in data store 155. The service 150 then may establish a unique case number and identification for the flight, identifies an expected sequence of aircraft events (gate pushback (EOBT)), runway entry (TMAT) and takeoff (OFF). The method 300 then moves to block 330 and the service 150 determines the departure is, or is not, a tactical departure. Whether or not the departure is a tactical departure may affect processes for release of an aircraft. For example, tactical departure scheduling usually involves a Call for Release (CFR) procedure in which a Local air traffic control (i.e., at a Local airport Tower) calls the Center to coordinate an aircraft release time prior to allowing the aircraft to depart. For non-tactical departures, release times are computed at the Center using a Center Traffic Management Advisor (TMA) decision support tool, based upon manual estimates of aircraft ready time that are verbally communicated from the Tower to the Center. In either case, the method 300 then moves to block 340 and the service 150 monitors and identifies signals received from the mobile device 103 as well as other data inputs (e.g., weather, aircraft sequencing). Also in block 340, the service 150 compares, where applicable, the received signals to known data in the data store 155 to identify the signals (for example, engine start, engine spin up, access door closure) and to log the signals and their originating event. The service 150 also may receive or calculate geographic position of airplane 19A, and determine when and if airplane 19A is moving. In an alternative to the comparisons of block 340 occurring at the service 150, the App 110 may execute certain comparison and report the results to the service 150. For example, a mobile device 103 may record a sound signature, and the processor 108 may identify the sound signature as engine startup. Following block 340, the method 300 moves to block 350 and the service 150 determines if the recorded/logged data and information indicate an aircraft event and a change in aircraft event and operational state. For example, the service 150 may receive audio shown to correspond to jet engine low speed operation for airplane 19A, a change in geographic position, yaw rate, and acceleration of airplane 19A, and compare these event indicators to the EOBT to establish that airplane 19A has pushed-back from its gate. The service 150 may detect signals, compare the signals to signal indicative of further expected events in the departure, and determine airplane 19A has reached the runway (TMAT). Similarly, the service 150 may determine airplane 19A is accelerating to takeoff.

In block 360, after the service 150 confirms an aircraft event has been reached (and operation state has changed), and sends a corresponding message or alert to Local and center flight management. The service 150 repeats block 360 until all aircraft surface events have been confirmed and reported. In parallel with block 360, the service 150 executes one or more statistical or probability routines to provide statistical data (e.g., confidence intervals and levels) and/or probability data (e.g., Bayesian probability) that an upcoming aircraft surface event will occur at an expected (scheduled) time. The service 150 may provide the statistical/probability information with the message or alert. In block 370, the service 150 receives an OFF indication and or an indication of TRACON acquisition, and the method 300 moves to block 380, where the processor 153 stores the data associated with flight 202 of airplane 19A. The method 300 then ends.

FIG. 3C illustrates an example ASSET system startup and associated health monitor method 301a. In block 302, the App 110 receives a power on signal from the mobile device 103 and begins a power-on self-test routine to verify proper signal and data connectivity and feeds from components such as sensors 105 (e.g., by causing transmission of a test signal to each sensor 109 and receiving a response) and other components of the mobile device 103 and components of the EFB 101, as applicable. The App 110 also may cause the processor 108 to send a test signal to the service 150 to confirm connectivity. In block 303, if the health monitor 113 determines an initial health of the App 110 is satisfactory or degraded, the health monitor 113 causes the processor 108 to send an online alert to the service 150, and to display 141. The health monitor 113 additionally may cause the processor 108 to send an appropriate alert to the display 143. Note that in an alternative to visual alerts on displays 141 and 143, the health monitor 113 may cause the processor 108 to send a text message (SMS, or similar) to the service 150, and optionally, to the cockpit crew, although generally, the cockpit crew would not be expected to monitor for such text messages (or visual alerts) or take any action in response to text or visual alerts. Following block 303 (NO), method 301*a* returns to block 302 and the startup self-test and initial health check may repeat until the ASSET system online alert conditions are met. Alternately, after an unsatisfactory initial, or one or more additional unsatisfactory start up self-tests and initial health checks, the App 110 may cause the processor 108 to provide an offline alert (visual or text). Following block 303 (YES), method 301*a* moves to block 305, and the App 110 determines if a current event in the departure/arrival sequence is a last scheduled event. If the current event is not the last scheduled event, method 301*a* returns to block 302, and the health monitor 113 performs continuous or periodic health checks, repeating the processes of blocks 302-305 until a defined point (event) in the departure and/or arrival sequence is reached. Following block 305 (YES), the method 301*a* moves to block 306, processor 108 causes display of an offline alert, method 301*a* moves to block 370 (FIG. 3B) and method 301*a* ends.

The preceding disclosure refers to flowcharts and accompanying descriptions to illustrate the embodiments represented in FIGS. 3A-3C. The disclosed devices, components, and systems contemplate using or implementing any suitable technique for performing the steps illustrated. Thus, FIGS. 3A-3C are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs; i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. An automatic, autonomous predictive aircraft surface state event track (ASSET) system, comprising:
    an application installed on a mobile device onboard an aircraft operating on a surface of an airport, comprising machine instructions encoded on a non-transitory computer-readable storage medium, the instructions executed by a processor of the mobile device to:
        receive sensor data from aircraft onboard sensors, the sensor data indicating an operational state of the aircraft,
        process the sensor data, and
        transmit the processed sensor data; and
    a remote service that receives the transmitted processed sensor data, comprising:
        a remote, non-transitory computer-readable storage medium having encoded thereon machine instructions that when executed by a remote processor, cause the remote processor to:
            compute an operational state of the aircraft;
            identify future aircraft events associated with the aircraft; and
            using the aircraft operational state, the sensor data, and the events, provide to aircraft flight control a prediction that within a statistically-derived time window, the aircraft will meet a future aircraft surface state event.

2. The system of claim 1, further comprising the remote processor:
    executing a statistical routine and providing statistical data from the execution relating to a predicted occurrence of a scheduled aircraft surface state event; and
    generating an event prediction message comprising the prediction and the statistical data.

3. The system of claim 2, wherein the statistically derived time window comprises a confidence level and a confidence interval.

4. The system of claim 2, wherein the prediction further comprises a probabilistic determination that the future event occurs within the statistically derived time window.

5. The system of claim 1, wherein the application comprises a health monitor, the health monitor comprising machine instructions that when executed by the processor, cause the processor to:
    determine a quality of the sensor data;
    provide a quality indication based on the determined quality; and
    transmit, with the sensor data, the determined quality to the remote service.

6. The system of claim 5, wherein the health monitor performs a startup health check of the mobile device and periodic health checks thereafter.

7. The system of claim 5, wherein the processor executes the health monitor machine instructions to generate online and offline alerts based on the quality indication, and causes the alerts to be displayed onboard the aircraft and at the remote service.

8. The system of claim 7, wherein the alerts comprise text messages and warning lights.

9. The system of claim 1, wherein to compute the operational state of the aircraft, the remote processor:
compares digital audio data recorded at the mobile device with known sound profiles for the aircraft; and
compares aircraft motion data recorded at the mobile device with known motion data for the aircraft, and wherein based on the comparison, the remote processor determines the aircraft is at the operational state.

10. The system of claim 1, wherein the mobile device acquires additional signals information including aircraft speed and direction information.

11. The system of claim 1, wherein the sensor data received at the application comprises aircraft acceleration, speed, direction, change of direction, and sound data associated with operation of the aircraft.

12. The system of claim 11,
wherein the remote processor compares the received sensor data with known data associated with historical aircraft operations and events;
wherein the known data are data specific to:
the airport, including an airport map,
a type of the aircraft, and
weather local to the airport.

13. An autonomous and automatic method for predicting an aircraft operating on an airport surface will meet a scheduled event, comprising:
a processor on a mobile device onboard the aircraft:
receiving sensor data from aircraft onboard sensors, the sensor data indicating an operational state of the aircraft,
processing the sensor data, and
transmitting the processed sensor data; and
a remote service processor:
receiving the transmitted processed sensor data,
determining an operational state of the aircraft based on the received sensor data,
identifying future aircraft surface state events based on the determined operational state, and
using the aircraft operational state, the sensor data, and the events, generating and sending to aircraft flight control a prediction that within a statistically-derived time window, the aircraft will meet a future aircraft surface state event.

14. The method of claim 13, further comprising the remote processor:
executing a statistical routine and providing statistical data from the execution relating to a predicted occurrence of a scheduled aircraft surface state event; and
preparing an aircraft surface state event prediction message comprising the generated prediction.

15. The method of claim 14, wherein the statistically derived time window comprises a confidence level and a confidence interval.

16. The method of claim 14, wherein the prediction further comprises a probabilistic determination that the future event occurs within the statistically derived time window.

17. The method of claim 14, further comprising the processor executing a health monitor process, comprising the processor:
determining a quality of the sensor data,
providing a quality indication based on the determined quality, and
transmitting, with the sensor data, the determined quality to the remote service.

18. The method of claim 17, wherein the remote processor:
generates the prediction message when the determined quality is above a threshold value; and
transmits the prediction message.

19. The method of claim 17, wherein processor executes the health monitor process as a startup health check of the mobile device and periodic health checks thereafter.

20. A system for predicting a future scheduled event for an aircraft operating on a surface of an airport occurs within a statistically derived time window, comprising:
a mobile device onboard the aircraft, the mobile device comprising:
a plurality of sensors providing sensor data indicative of an operational state of the aircraft on the surface,
a non-transitory computer readable storage medium having encoded thereon machine instructions for processing the sensor data, and
a processor that executes the machine instructions to:
receive the sensor data;
determine an operational state of the aircraft;
determine a quality of the sensor data is above a threshold value; and
cause the mobile device to transmit the sensor data, the operational state, and an indication of the quality of the sensor data; and
a remote service in communication with the mobile device, comprising:
a receiver that receives the transmitted sensor data, the operational state, and the quality indication,
a remote non-transitory computer readable storage medium having encoded thereon machine instructions for processing the transmitted sensor data and the quality indication, and
a processor that executes the machine instructions to:
determine an operational state of the aircraft;
identify future aircraft surface state events associated with the aircraft;
generate a prediction that the aircraft will achieve a scheduled future event within a statistically derived time window; and
cause transmission of the prediction as a message to aircraft flight control.

* * * * *